US012757139B2

(12) United States Patent
Xu et al.

(10) Patent No.: US 12,757,139 B2
(45) Date of Patent: Oct. 6, 2026

(54) DATA TRANSMISSION METHOD, AND DEVICE AND STORAGE MEDIUM

(71) Applicant: ZTE CORPORATION, Shenzhen (CN)

(72) Inventors: Hui Xu, Shenzhen (CN); Zhongwei Ji, Shenzhen (CN); Jianfeng Ding, Shenzhen (CN); Xiaoquan Hua, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 280 days.

(21) Appl. No.: 18/690,552

(22) PCT Filed: Jun. 7, 2022

(86) PCT No.: PCT/CN2022/097415
§ 371 (c)(1),
(2) Date: Mar. 8, 2024

(87) PCT Pub. No.: WO2023/035702
PCT Pub. Date: Mar. 16, 2023

(65) Prior Publication Data
US 2024/0381274 A1 Nov. 14, 2024

(30) Foreign Application Priority Data
Sep. 10, 2021 (CN) ......................... 202111063839.6

(51) Int. Cl.
*H04W 56/00* (2009.01)
*H04L 1/00* (2006.01)
*H04W 76/40* (2018.01)

(52) U.S. Cl.
CPC ....... *H04W 56/0015* (2013.01); *H04L 1/0061* (2013.01); *H04W 76/40* (2018.02)

(58) Field of Classification Search
CPC . H01L 21/6875; H01L 21/687; H01L 21/027; H01L 21/304; H01L 21/67;
(Continued)

(56) References Cited

U.S. PATENT DOCUMENTS

2011/0070905 A1* 3/2011 Kazmi .................. H04W 72/30 455/507
2011/0256824 A1* 10/2011 Futaki ................... H04W 72/30 455/436
(Continued)

FOREIGN PATENT DOCUMENTS

CN 112469142 A 3/2021
EP 2852188 B1 11/2019
(Continued)

OTHER PUBLICATIONS

International Search Report in Application No. PCT/CN2022/097415, dated Aug. 20, 2022, 4 pages, including translation.
(Continued)

*Primary Examiner* — Nathan S Taylor
(74) *Attorney, Agent, or Firm* — Morgan, Lewis & Bockius LLP

(57) ABSTRACT

A data transmission method includes determining a multi-cell Multicast/Broadcast Service (MBS) synchronization transmission scenario; synchronously transmitting MBS control signaling to a second communication node over an air interface according to an MBS control signaling synchronization strategy corresponding to the multi-cell MBS synchronization transmission scenario; synchronously transmitting MBS user data to the second communication node over the air interface according to an MBS user data synchronization strategy and the MBS control signaling.

19 Claims, 12 Drawing Sheets

(58) Field of Classification Search
CPC ... H01L 21/683; G03F 7/707; G03F 7/70975; G03F 7/7095; G03F 7/00; G03F 7/20; H04L 1/0061; H04L 12/189; H04L 1/00; H04L 12/18; H04L 5/00; H04W 4/06; H04W 56/001; H04W 56/0015; H04W 72/30; H04W 76/40; H04W 56/00
See application file for complete search history.

(56) References Cited

U.S. PATENT DOCUMENTS

| | | | | |
|---|---|---|---|---|
| 2013/0055318 | A1* | 2/2013 | Wang | H04W 4/06 725/62 |
| 2014/0169258 | A1* | 6/2014 | Futaki | H04W 28/26 370/312 |
| 2015/0063188 | A1* | 3/2015 | Kanesalingam | H04L 12/1881 370/312 |
| 2015/0103724 | A1* | 4/2015 | Xu | H04W 4/06 370/312 |
| 2017/0353946 | A1* | 12/2017 | Rico Alvarino | H04W 4/70 |
| 2021/0136754 | A1* | 5/2021 | Ahlander | H04L 5/0053 |
| 2022/0225119 | A1* | 7/2022 | Liberg | H04B 7/18513 |
| 2022/0337367 | A1* | 10/2022 | Zhu | H04L 12/189 |
| 2022/0361161 | A1* | 11/2022 | Wei | H04W 72/30 |
| 2023/0276470 | A1* | 8/2023 | Di Girolamo | H04W 4/06 370/312 |
| 2023/0362960 | A1* | 11/2023 | Adjakple | H04W 4/08 |

FOREIGN PATENT DOCUMENTS

| | | | | | |
|---|---|---|---|---|---|
| EP | 2667523 | B1 | * | 3/2020 | H04W 72/30 |
| WO | WO-2011147268 | A1 | * | 12/2011 | H04W 72/30 |
| WO | 2021049871 | A1 | | 3/2021 | |
| WO | 2021093154 | A1 | | 5/2021 | |
| WO | WO2021/109429 | A1 | | 6/2021 | |

OTHER PUBLICATIONS

ZTE. “Discussion on the Split gNB Architecture Enhancement for MBS” 3GPP TSG-RAN WG3 #109-e R3-204649, Aug. 6, 2020, pp. 1-4.

TD Tech et al. “Discussion on Two Delivery Modes for NR MBS” 3GPP TSG RAN WG2 Meeting #113b-e R2-2103507, Apr. 1, 2021, pp. 1-11.

Extended European Search Report in Application No. 22866178.1, dated Aug. 12, 2025, 14 pages.

* cited by examiner

DATA TRANSMISSION METHOD, AND DEVICE AND STORAGE MEDIUM

CROSS REFERENCE TO RELATED APPLICATIONS

This is a National Stage Application, filed under 35 U.S.C. 371, of International Patent Application No. PCT/CN2022/097415, filed on Jun. 7, 2022, which claims priority to Chinese Patent Application No. 202111063839.6 filed Sep. 10, 2021, the contents of each are incorporated herein by reference in their entireties.

TECHNICAL FIELD

The present application relates to the field of communications and, in particular, a data transmission method, a device, and a storage medium.

BACKGROUND

In Long-Term Evolution (LTE), the same content may be simultaneously transmitted by multiple cells located in the same Multicast Broadcast Single Frequency Network (MBSFN) area by using MBSFN, and Multicast/Broadcast Service (MBS) signal quality may be improved for cell edge users by using time domain macro-diversity, while the transmission reliability of MBS is improved. In R18, New Radio (NR)-MBS adopts a 5G-based system architecture, where MBS is transmitted through the unicast subframe of a cell, which is completely different from the MBSFN subframe transmission of multi-cell in LTE. Therefore, how to achieve multi-cell synchronous transmission in an NR-MBS area is an urgent problem to be solved. SUMMARY An Embodiment of the present application provides a data transmission method. The data transmission method is applied to a first communication node and includes the following: determining a multi-cell Multicast/Broadcast Service (MBS) synchronization transmission scenario; synchronously transmitting MBS control signaling to a second communication node over an air interface according to an MBS control signaling synchronization strategy corresponding to the multi-cell MBS synchronization transmission scenario; synchronously transmitting MBS user data to the second communication node over the air interface according to an MBS user data synchronization strategy and the MBS control signaling.

An embodiment of the present application provides a data transmission method. The data transmission method is applied to a second communication node and includes the following: receiving an MBS service announcement message; receiving, according to the MBS service announcement message, MBS control signaling that is in a multi-cell MBS synchronization transmission scenario and sent by a first communication node; receiving MBS user data of interest according to the MBS control signaling.

An embodiment of the present application provides a communication device. The communication device includes a communication module, a memory, and one or more processors.

The communication module is configured to perform communication interaction among a first communication node, a second communication node, a first network element, a second network element, a core network element, and an access stratum network element.

The memory is configured to store one or more programs.

When executed by the one or more processors, the one or more programs cause the one or more processors to perform the method of any one of the preceding embodiments.

An embodiment of the present application provides a storage medium. The storage medium stores a computer program that, when executed by a processor, performs the method of any one of the preceding embodiments.

DETAILED DESCRIPTION

Embodiments of the present application are described below in conjunction with drawings. The present application is described below in conjunction with accompanying drawings of the embodiments. The examples given are only used to explain the present application and are not intended to limit the scope of the present application.

With the rapid development of the Internet and the popularization of large-screen multi-function mobile terminals, a large number of mobile data multimedia services and various high-bandwidth multimedia services emerge, such as videoconferencing, television broadcasting, video on demand, advertisement, online education, and interactive games. On one hand, the multi-service needs of mobile users are met, and on the other hand, new service growth points are brought to mobile operators. These mobile data multimedia services require multiple users to receive the same data at the same time. Compared with general data services, these services feature large data volume, long duration, and sensitivity to delay.

Figure 1:
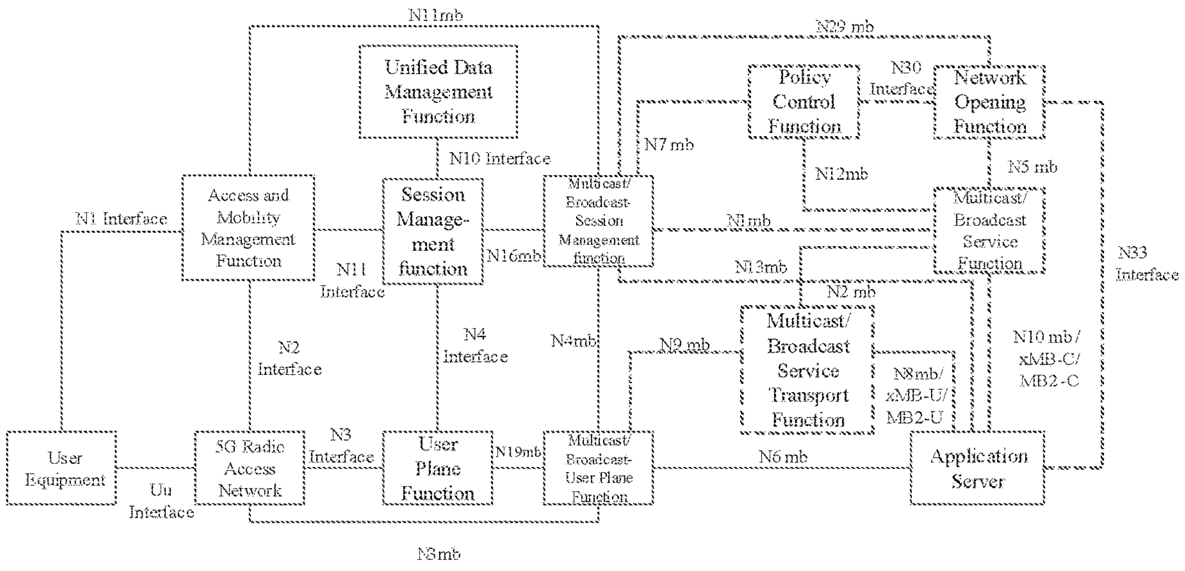
FIG. 1 is a diagram illustrating a system architecture of 5G MBS provided by the existing technology.

To effectively utilize mobile network resources, the 3rd Generation Partnership Project (3GPP) proposes MBS in 5G Rel-17. The MBMS is a technology for transmitting data from one data source to multiple target mobile terminals, achieving sharing of network (including a core network and an access network) resources and improving the utilization rate of network resources (especially air interface resources). The MBS service defined by 3GPP can not only achieve multicast and broadcast of plain-text low-rate messages, but also achieve broadcast and multicast of high-speed multimedia services, and provide a variety of rich video, audio, and multimedia services, which undoubtedly follows the trend of the future mobile data development and provides a better service prospect for the development of 3GPP. FIG. 1 is a diagram illustrating a system architecture of 5G MBS provided by the existing technology.

An important feature of LTE is the transmission of Multimedia Broadcast Multicast Service (MBMS) data using an Orthogonal Frequency Division Multiplexing (OFDM) radio interface and based on a synchronous single frequency network, which is referred to as MBSFN operation.

Figure 2:
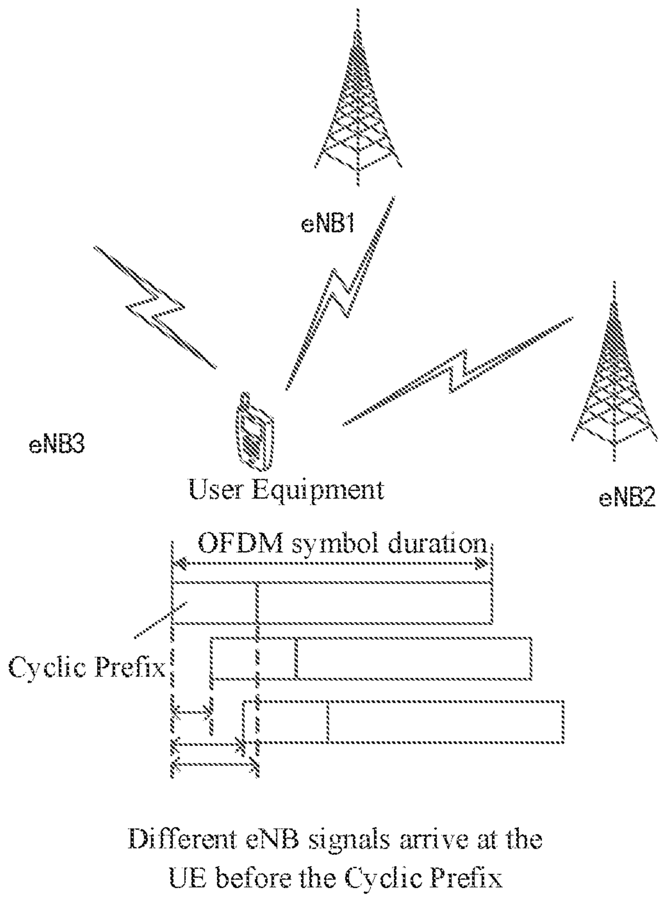
FIG. 2 is a diagram illustrating an LTE MBSFN transmission according to an embodiment of the present application.

FIG. 2 is a diagram illustrating an LTE MBSFN transmission according to an embodiment of the present application. In MBSFN transmission, MBMS data are simultaneously transmitted over the air interface through multiple time-synchronized cells. A User Equipment (UE) receives MBMS signals transmitted by multiple cells with different transmission delays. If the signals from multiple cells arrive at the UE within the cyclic prefix at the beginning of a symbol, no Inter-Symbol Interference (ISI) exists, and the UE may regard MBSFN transmissions from multiple cells as one large cell transmission. A UE receiver handles multi-cell transmissions using multipath combining as the UE receiver does for single-cell transmissions, without incurring additional complexity.

The MBSFN transmission can greatly improve spectral efficiency and play a key role in the reception of cell edge users. Meanwhile, it is possible to convert neighboring cell transmissions that may constitute inter-cell interference into useful signal energy, so the received signal power is greatly enhanced.

To achieve the combining of multi-cell transmission signals, the Physical Multicast Channel (PMCH) subframe structure transmitted by MBSFN uses extended Cyclic Prefix (CP). The difference in multi-cell propagation delays is generally much greater than single-cell delay spread. A longer CP helps ensure that the received signal falls within the CP of the UE receiver, thereby reducing the possibility of ISI. This avoids the complexity of the equalizer at the UE receiver, but also results in some loss of peak data rate due to the additional overhead of the longer CP.

In LTE, an MBSFN transmission mode is adopted, the same Modulation and Coding Scheme (MCS) format is adopted in multiple cells, and the same content is transmitted by using the same physical resource. Features of MBMS multi-cell transmission include the following: (1) Synchronous transmission is performed within an MBSFN area; (2) Combining of multi-cell MBMS transmission is supported; (3) Multicast Traffic Channel (MTCH) and Multicast Control Channel (MCCH) are mapped to an MCH transmission channel in a Point-To-Multipoint (P-T-M) mode; (4) An MBSFN synchronization area, an MBSFN area, MBSFN transmission, and others are semi-statically configured by Operation, Administration and Maintenance (OAM). Thus, UEs in multiple cells can receive multiple MBMS data with the same content and perform Single Frequency Network (SFN) combing, thereby improving the gain of the received signal. Multiple cells that use the same physical resource and the MBSFN sending mode to send the same MBMS service constitute an MBSFN area.

The MBS service may need to broadcast/multicast the same content in a larger geographical area, such as user equipment firmware updates, real-time public safety information broadcast, and propagation of images, videos, audio, and other content in stadiums/concert halls. In this case, multiple cells may need to send the same content at the same time. If SFN can be used for transmission, not only the spectral efficiency can be improved, but also the inter-cell signal interference can be greatly reduced.

The synchronous transmission in this embodiment of the present application means that a base station (gNB) sends the same content on the same air interface resource. The same resource includes time domain, frequency domain, Bandwidth Part (BWP) and further includes spatial domain (such as beam). The same content refers to the same MBS data, including the same MBS session identity, the same MBS data packet number, the same MBS data packet timestamp, and the same MBS area identity. The transmission includes one of multicast or broadcast.

Figure 3:
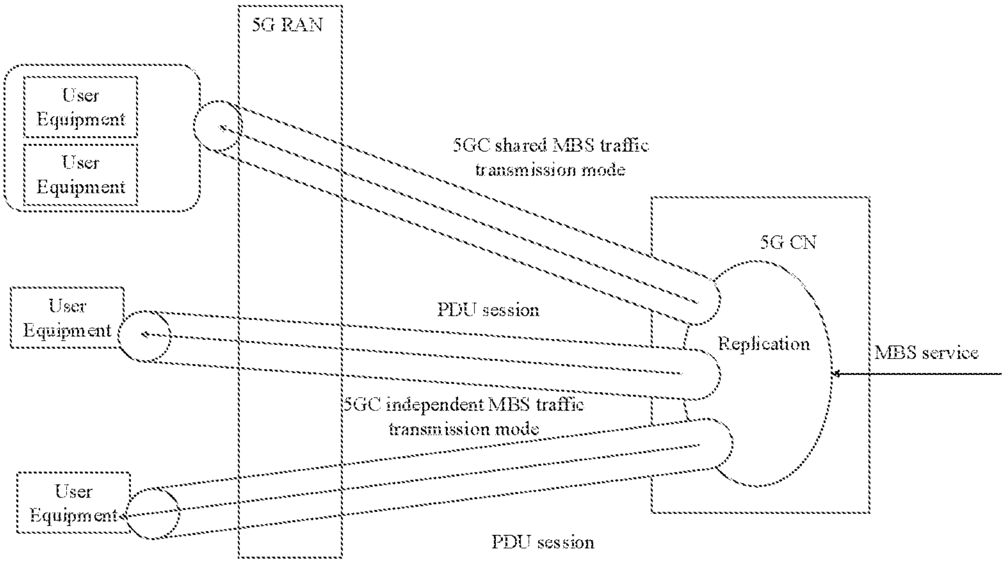
FIG. 3 is a diagram illustrating a 5G MBS traffic transmission mode according to an embodiment of the present application.

FIG. 3 is a diagram illustrating a 5G MBS traffic transmission mode according to an embodiment of the present application. The 5G MBS traffic transmission mode includes two types from the perspective of 5G core network, that is, 5G core network (5GC) independent MBS traffic transmission mode and 5GC shared MBS traffic transmission mode. From the perspective of Radio Access Network (RAN), the preceding 5GC shared MBS traffic transmission mode may also be classified into two types over the air interface, that is, a point-to-point transmission mode and a point-to-multipoint transmission mode.

With the feature that the MBS technology sends broadcast data to a service area, IPTV, software distribution, group communication, Internet Of Thing (IOT) application, vehicle to everything (V2X) application, and other applications can be achieved.

Figure 4:
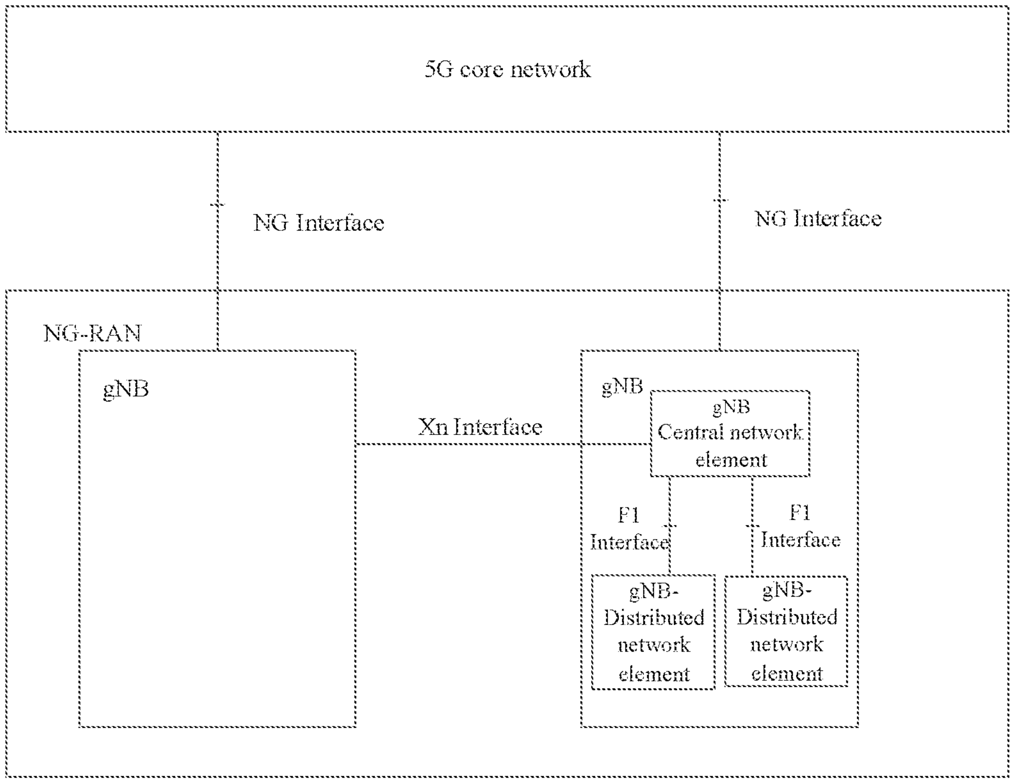
FIG. 4 is a diagram illustrating an overall architecture of 5G NG-RAN according to an embodiment of the present application.

FIG. 4 is a diagram illustrating an overall architecture of 5G NG-RAN according to an embodiment of the present application. As shown in FIG. 4, NG-RAN includes one or more gNBs, and gNBs are connected to the core network 5GC through an NG interface. gNBs may be interconnected through an Xn interface. A gNB consists of a gNB-CU and one or more gNB-DUs. gNB-CU is a logical node responsible for Radio Resource Control (RRC), Service Data Adaptation Protocol (SDAP), and Packet Data Convergence Protocol (PDCP) protocols in gNB. gNB-DU is responsible for Radio Link Control (RLC), Medium Access Control (MAC), and Physical Layer (PHY) layer protocols in gNB. A gNB-DU supports one or more cells, and a cell is supported by a unique gNB-DU. gNB-CU and gNB-DU are connected through F1 interface. NG, Xn, and F1 are all logical interfaces.

In 5G MBS, a new system architecture and a wireless resource allocation mode are adopted. In the existing LTE system, the MBSFN transmission scheme cannot be used, and a multi-cell synchronous transmission needs to be re-selected and designed. For example, neither MBSFN transmission mode nor MBSFN subframe design exists in 5G MBS. In 5G, a single-cell Physical Downlink Shared Channel (PDSCH) is used for transmitting MBS. The network architecture of 5G MBS is completely different from that of LTE eMBMS, without the addition of Broadcast-Multicast Service Center (BM-SC), MBMS Gateway (MBMS-GW), Multicell/Multicast Coordination Entity (MCE, a logical entity introduced specifically for MBSFN multi-cell transmission), and other network elements.

In an embodiment of the present application, a multi-cell synchronous transmission design for 5G MBS includes the following: For a multi-cell synchronous transmission in the same first network element (for example, intra-DU) scenario, gNB-DU is responsible for synchronously transmitting control signaling and user data of multiple cells participating in MBS transmission. For multi-cell synchronous transmission under different first network elements (for example, inter-DU) in the same second network element (for example, intra-gNB/intra-CU) scenario, multi-cell synchronous transmission is achieved by gNB-CU and multiple gNB-DUs participating in MBS transmission through the signaling interaction of the F1 interface, and gNB-CU notifies multiple gNB-DUs of the same control signaling update count and time starting point. For multi-cell synchronous transmission in different first communication nodes (for example, inter-gNB)/different second network elements (for example, inter-CU) scenario, the control signaling synchronization transmission and the user data synchronization transmission are separately designed; for the synchronous transmission of multi-cell control signaling, the same update time of multi-cell control signaling and the same transmission resources of the corresponding multiple cells are determined by at least one of the following: OAM, multiple gNBs participating in the synchronous transmission coordinating through Xn interface signaling, or adding a new wireless access stratum logical network element. In an embodiment, the same MBS transmission resource includes time domain, frequency domain, code domain, subcarrier spacing (SCS), Cyclic Prefix (CP), Modulation and Coding Scheme (MCS), and others. The preceding MBS transmission resource includes an MBS control signaling transmission resource and an MBS user data transmission resource. For the synchronous transmission of multi-cell user data, the transmission time of the user data is determined by Multicast/Broadcast-User plane function (MB-UPF)/User plane function (UPF) and a synchronization data protocol between multiple gNBs participating in the multi-cell transmission, and the sending time of the received MBS data packet over the air interface is determined by multiple gNBs according to the control signaling of the multi-cell synchronous transmission and the synchronization data protocol. The control signaling is transmitted through a Physical Downlink Control Channel (PDCCH). User data are transmitted through a PDSCH. The synchronous data protocol packet is transmitted through an Internet Protocol (IP) packet. The UE interested in receiving MBS data receives and combines the control signaling on the PDCCH transmitted by multiple gNBs, then determines the sending time and sending resource of the MBS data according to the combined control signaling, and then receives and combines MBS data on the PDSCH transmitted by multiple gNBs.

To achieve multi-cell MBS synchronization transmission, MBS symbols, such as symbols carrying a PDCCH and a PDSCH, may be sent by using a longer CP (that is, ECP, which refers to extended CP) than the existing CP. ECP may be used to effectively achieve time domain macro-diversity and combine MBS signals sent by multiple cells. Since the difference in multi-cell propagation delays is generally much greater than single-cell delay spread, a longer CP helps ensure that a received signal falls within the CP of a UE receiver, thereby reducing the possibility of ISI. This avoids the complexity of the equalizer at the UE receiver, but also results in some loss of peak data rate due to the additional overhead of the longer CP. Additionally, the use of ECP may also increase the complexity of UE hardware implementation.

Using the preceding methods of synchronous transmission in 5G NR MBS, the user equipment (UE) receives and combines MBS control signaling and user data according to a base station instruction, which greatly improves spectrum efficiency and the signal quality received by cell edge UEs from MBS.

Figure 5:
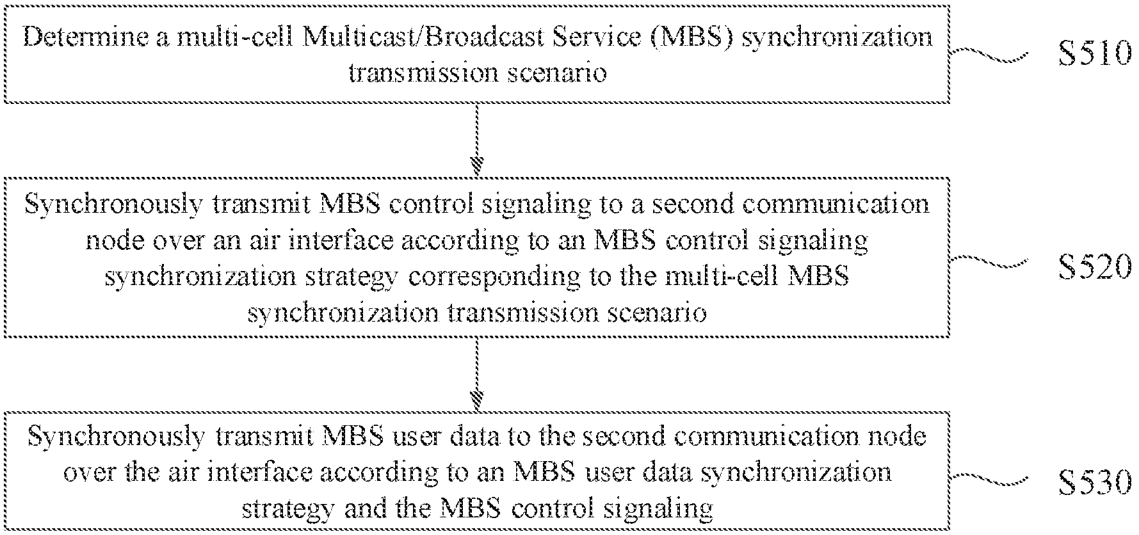
FIG. 5 is a flowchart of a data transmission method according to an embodiment of the present application.

In an embodiment, FIG. 5 is a flowchart of a data transmission method according to an embodiment of the present application. This embodiment may be executed by a data transmission device. The data transmission device may be a first communication node. Illustratively, the first communication node may be a base station. As shown in FIG. 5, this embodiment includes S510 to S530.

In S510, a multi-cell Multicast/Broadcast Service (MBS) synchronization transmission scenario is determined.

In an embodiment, the multi-cell MBS transmission synchronization scenario includes one of the following: a multi-cell synchronous transmission within the same first network element; a multi-cell synchronous transmission under different first network elements in the same second network element; a multi-cell synchronous transmission under different second network elements or different first communication nodes. In an embodiment, the multi-cell synchronous transmission within the same first network element means that the same first network element includes multiple cells and that the multiple cells are divided into one SFN area, that is, multiple cells transmit MBS control signaling and MBS user data synchronously. The synchronization refers to synchronous transmission in time and also means that the same content is sent using the same transmission resource. The same transmission resource includes, for example, time domain, frequency domain, BWP, subcarrier spacing, cyclic prefix, and modulation and coding scheme. The same content includes MBS control signaling and MBS user data.

In an embodiment, the multi-cell synchronous transmission under different first network elements in the same second network element refers to the synchronous transmission of multiple first network elements under one first communication node. In an embodiment, the same second network element belongs to the same first communication node, that is, the synchronous transmission of multiple first network elements under one first communication node. A second network element is responsible for the synchronous transmission of multiple first network elements. The second network element configures the same transmission resources for cells under multiple first network elements and instructs multiple first network elements to send the same content at the same transmission time. The second network element communicates with the multiple first network elements through F1 interface signaling.

In an embodiment, the multi-cell synchronous transmission under different second network elements or different first communication nodes may be understood as that different second network elements belong to different first communication nodes and that only by ensuring synchronization among multiple first communication nodes can the multi-cell synchronous transmission under different second network elements or different first communication nodes be achieved.

In S520, MBS control signaling is synchronously transmitted to a second communication node over an air interface according to an MBS control signaling synchronization strategy corresponding to the multi-cell MBS synchronization transmission scenario.

In an embodiment, the first communication node, according to the MBS control signaling synchronization strategy corresponding to each multi-cell MBS synchronization transmission scenario, determines the same transmission resources and transmission time of multiple cells and synchronously transmits the MBS control signaling to the second communication node at the same transmission time and the same transmission resources.

In S530, MBS user data is synchronously transmitted to the second communication node over the air interface according to an MBS user data synchronization strategy and the MBS control signaling.

In an embodiment, the first communication node, according to an MBS user data synchronization strategy corresponding to each multi-cell MBS synchronization transmission scenario, determines the transmission time of multiple cells and synchronously transmits MBS user data to the second communication node at the same transmission time and MBS control signaling.

In an embodiment, the multi-cell MBS transmission synchronization scenario is a multi-cell synchronous transmission within the same first network element, and synchronously transmitting the MBS control signaling to the second communication node over the air interface according to the MBS control signaling synchronization strategy corresponding to the multi-cell MBS synchronization transmission scenario includes the operations described below. The same transmission resource is configured for multiple cells through the first network element and a second network element to which the first network element belongs. The same MBS control signaling is simultaneously transmitted to the second communication node on the same transmission resource of the multiple cells.

In an embodiment, in a scenario where multiple cells in the same first network element perform synchronous transmission, a second network element to which the first network element belongs and a second network element configure the same transmission resources for the multiple cells, and the same MBS control signaling is sent synchronously on the same transmission resources of multiple cells. A first network element belongs to a first communication node. A communication node is connected to an MB-UPF. The synchronization of the MBS control signaling is performed by a first network element and a second network element connected to the first network element.

In an embodiment, the multi-cell MBS transmission synchronization scenario is a multi-cell synchronous transmission under different first network elements in the same second network element, and synchronously transmitting the MBS control signaling to the second communication node over the air interface according to the MBS control signaling synchronization strategy corresponding to the multi-cell MBS synchronization transmission scenario includes the operations described below. A second network element sends synchronization instruction information to a first network element through a first interface. The first network element synchronously transmits the same MBS control signaling to the second communication node at the same transmission time and the same transmission resources according to the synchronization instruction information.

In an embodiment, the first interface is an interface between the first network element and the second network element. In a scenario where multiple cells perform synchronous transmission under different first network elements in the same second network element, the same first network element belongs to the same first communication node, one communication node is connected to one MB-UPF, the second network element indicates synchronization between multiple first network elements through the first interface, and the multiple first network elements synchronously transmit the same MBS control signaling to the second communication node at the same transmission time and on the same transmission resources according to the instruction of the second network element.

In an embodiment, the multi-cell MBS transmission synchronization scenario is a multi-cell synchronous transmission under different second network elements or different first communication nodes, and synchronously transmitting the MBS control signaling to the second communication node over the air interface according to the MBS control signaling synchronization strategy corresponding to the multi-cell MBS synchronization transmission scenario includes the operation described below. The same transmission resources are configured for synchronously transmitting the MBS control signaling through at least one of Operation, Administration and Maintenance (OAM) configuration, second interface coordination, or a newly added access stratum network element.

In an embodiment, the second interface is an interface between the first communication nodes. In a scenario where multiple cells perform synchronous transmission under different second network elements or different first communication nodes, since multiple cells belong to different first communication nodes or different first network elements, different synchronous transmission mechanisms are configured between different first communication nodes or different first network elements to implement the synchronous transmission.

In an embodiment, OAM configuration, the first communication node coordinating through the second interface, or the newly added access stratum network element (that is, a logical entity) may be responsible for wireless interface synchronization. OAM means that an instruction is sent to multiple first communication nodes through network management and that the multiple first communication nodes synchronously transmit the MBS control signaling over the air interface according to the received instruction. A second interface exists between the first communication nodes, and multiple first communication nodes synchronously transmit the MBS control signaling through the interaction of the second interface signaling. An access stratum network element is added, the access stratum network element may be connected to multiple first communication nodes, and the first communication node synchronously transmits the MBS control signaling over the air interface according to the instruction of the access stratum network element.

In an embodiment, the transmission resource in which the MBS control signaling is located is indicated by a system broadcast message, and the content of the MBS control signaling may be indicated by OAM, the second interface signaling, or the newly added access stratum network element. In an embodiment, the MBS control signaling may adopt periodic transmission, that is, the transmission periods of different first communication nodes or different first network elements are the same; the same start period is counted at the same time, and each count is incremented by one for each period. The start period of the MBS control signaling may be specified by OAM, the second interface signaling, or the newly added access stratum network element, and the value of the period counter is also stored by a corresponding network element, for example, an OAM server, a first communication node, or a newly added logical network element.

In an embodiment, synchronously transmitting the MBS user data to the second communication node over the air interface according to the MBS user data synchronization strategy and the MBS control signaling includes the operations described below. The transmission time is determined according to an MBS synchronization data packet sent by a core network element. The MBS user data is synchronously transmitted to the second communication node according to the transmission time and the MBS control signaling.

In an embodiment, the core network element sends the MBS synchronization data packet to the first communication node to enable multiple first communication nodes to receive the same MBS user data from the core network. In an embodiment, the MBS synchronization data packet and the MBS user data may be sent to multiple first communication nodes together; alternatively, the MBS synchronization data packet may be sent to multiple first communication nodes independently by the core network element. In an embodiment, the first communication node determines, according to the MBS synchronization data packet, the transmission time of the MBS user data and synchronously transmits the MBS user data to the second communication node according to the transmission synchronization and MBS control signaling.

In an embodiment, the MBS synchronization data packet includes a data packet timestamp; a data packet count value; a cyclic redundancy check (CRC). In an embodiment, the data packet timestamp may be understood as a relative time value, that is, the relative time value refers to the generation time value of the MBS data packet by multiple first communication nodes relative to a common start time. The MBS data packet generated within a preset time range may be configured with the same relative time value. The preset time range is related to the MBS air interface scheduling cycle; for example, one or more MBS air interface scheduling periods may be configured. The data packet count value refers to the count value of the current data packet within a synchronization cycle. In an embodiment, multiple first communication nodes determine the MBS user data to be sent over the air interface based on the content of the received MBS synchronization data packet, so as to achieve synchronous transmission of MBS user data over the air interface.

In an embodiment, the MBS synchronization data packet also includes at least one of a data packet length or data packet payload. The data packet length refers to the specific data packet byte length.

In an embodiment, the MBS control signaling includes MBS resource configuration signaling.

In an embodiment, the MBS control signaling also includes at least one of an MBS-related System Information Block (SIB), an MBS update notification, or MBS scheduling signaling.

In an embodiment, the content of control signaling includes at least one of the following: an MBS transmission resource; an MBS transmission area; configuration information of an MBS update notification; an MBS session identity; an MBS synchronization area identity; or MBS scheduling information. In an embodiment, the MBS transmission area refers to a transmission area of the MBS user data, which may be indicated by a cell identity.

In an embodiment, the MBS transmission resource includes a transmission resource of the MBS control signaling and a transmission resource of the MBS user data.

In an embodiment, the MBS transmission resource includes time domain, frequency domain, and BWP.

In an embodiment, the MBS transmission resource also includes at least one of the following: SCS, CP, MCS, or beam.

In an embodiment, the data transmission method applied to the first communication node also includes the operations described below. ECP is configured. The ECP is used for carrying symbol transmission of a Physical Downlink Control Channel (PDCCH) and symbol transmission of a Physical Downlink Shared Channel (PDSCH). In an embodiment, the first communication node may determine the size of ECP based on at least one of the following conditions: an MBS transmission area, UE capabilities, MBS service requirements, OAM, or operator requirements. In an embodiment, ECP refers to cyclic prefix that exceeds the length of the existing CP. To ensure backward compatibility, ECP may be employed when SCS=15 KHz.

In an embodiment, the data transmission method applied to the first communication node also includes the operation described below. MBS control signaling including the ECP and MBS user data including the ECP are synchronously transmitted to the second communication node over the air interface according to the data synchronization strategy corresponding to the multi-cell MBS synchronization transmission scenario. In an embodiment, the MBS control signaling including the ECP refers to a PDCCH adopting the ECP, that is, a symbol including the PDCCH adopts the ECP; the MBS user data including the ECP refers to the MBS user data transmitted on a PDSCH, that is, a symbol including the PDSCH adopts the ECP.

Figure 6:
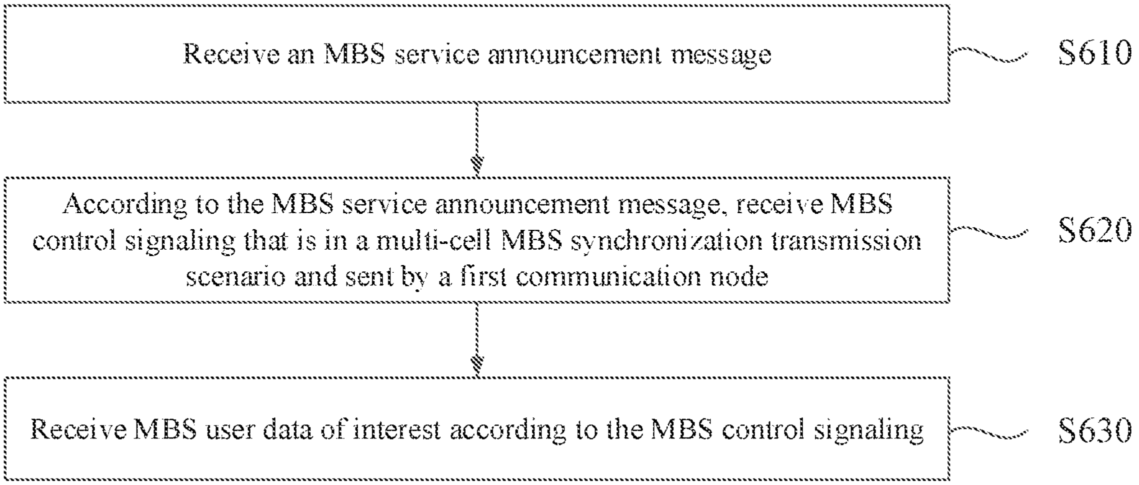
FIG. 6 is a flowchart of another data transmission method according to an embodiment of the present application.

In an embodiment, FIG. 6 is a flowchart of another data transmission method according to an embodiment of the present application. This embodiment may be executed by a data transmission device. The data transmission device may be a second communication node. Illustratively, the second communication node may be a terminal side (for example, a user equipment). As shown in FIG. 6, this embodiment includes S610 to S630.

In S610, an MBS service announcement message is received.

In an embodiment, the second communication node receives the MBS announcement message sent by an application server to obtain the identity of the MBS service and information such as transmission carrier frequency.

In S620, according to the MBS service announcement message, MBS control signaling is received which is in a multi-cell MBS synchronization transmission scenario and sent by a first communication node.

In an embodiment, the second communication node in the synchronization area receives a cell system broadcast message, and according to the system broadcast message, acquires configuration information of the MBS control signaling, and according to the configuration information, receives the MBS control signaling. In an embodiment, the MBS control signaling includes MBS resource configuration signaling. The MBS resource configuration signaling may include RRC signaling, MAC CE signaling, and PDCCH signaling. Illustratively, the Radio Network Temporary Identity (RNTI) value and time domain information corresponding to the Temporary Mobile Group Identity (TMGI) of interest are obtained through RRC signaling, and the required control information is detected according to the RNTI value and the time domain information. In an embodiment, the MBS control signaling also includes an MBS update notification, that is, a message for indicating that the MCCH is updated. In an embodiment, the content of the MBS control signaling is divided into a semi-static part and a dynamic part. The semi-static part adopts the instructions of RRC signaling and MAC CE signaling and is carried by a PDSCH. The content of the semi-static part may include an MBS session identity, an MBS transmission area, and an MBS scheduling period. The dynamic part adopts the instruction of Downlink Control Information (DCI) of the PDCCH and adopts the RNTI corresponding to the MBS session identity and the CRC of the PDCCH to perform a modulo 2 addition (exclusive OR) operation. The content of the dynamic part includes a beam, an MBS frequency domain resource configuration, power control, modulation and coding scheme, an MBS update notification, and others.

In S630, MBS user data of interest are received according to the MBS control signaling.

In an embodiment, the second communication node receives, according to the instruction of the MBS control signaling, the MBS user data of interest on the corresponding MBS transmission resource. In an embodiment, the MBS user data may be carried by a PDSCH.

In an embodiment, the multi-cell MBS transmission synchronization scenario includes a multi-cell synchronous transmission within the same first network element.

In an embodiment, the multi-cell MBS transmission synchronization scenario includes a multi-cell synchronous transmission under different first network elements in the same second network element.

In an embodiment, a multi-cell MBS transmission synchronization scenario includes a multi-cell synchronous transmission under different second network elements or different first communication nodes.

In an embodiment, the data transmission method applied to the second communication node also includes receiving MBS control signaling including ECP and MBS user data including the ECP that are in a multi-cell MBS synchronization transmission scenario and sent by a first communication node. In an embodiment, the second communication node receives the MBS control signaling including the ECP, which indicates that the PDCCH including the ECP is received; the second communication node receives the MBS user data including the ECP, which indicates that the PDSCH including the ECP is received. In an embodiment, the second communication node receives a PDCCH signal including the ECP and a PDSCH signal including the EC and combines the PDCCH and PDSCH signals received by multiple cells.

Figure 7:
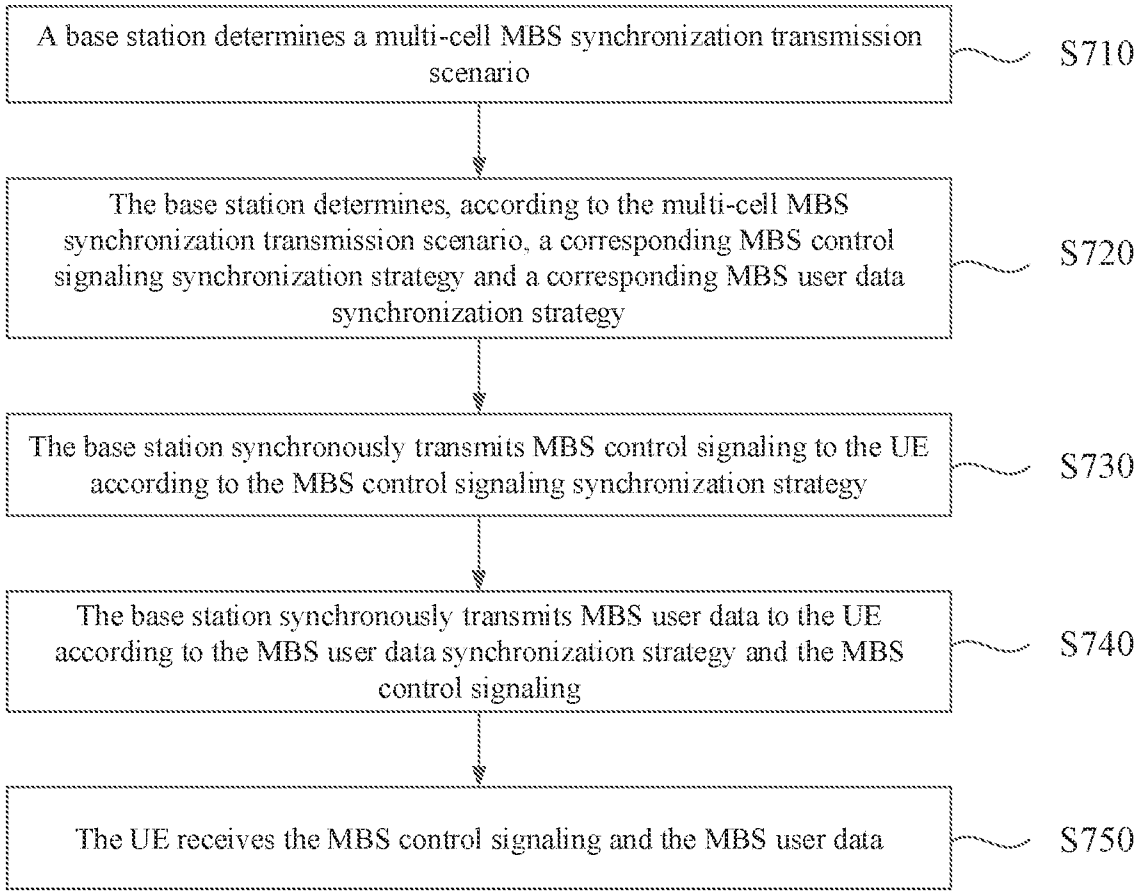
FIG. 7 is a flowchart of a data synchronization transmission according to an embodiment of the present application.

In an embodiment, FIG. 7 is a flowchart of a data synchronization transmission according to an embodiment of the present application. In an embodiment, the synchronization process of data transmission is described by using an example in which a first network element is DU, a second network element is CU, a first communication node is a base station, a second communication node is a UE, a first interface is an F1 interface, a second interface is an Xn interface, and a core network element is MB-UPF. As shown in FIG. 7, the implementation process of data synchronization transmission in this embodiment includes S710 to S740.

In S710, a base station determines a multi-cell MBS synchronization transmission scenario.

In an embodiment, the multi-cell MBS transmission synchronization scenario includes one of the following: a multi-cell synchronous transmission within the same DU; a multi-cell synchronous transmission under different CUs in the same DU; a multi-cell synchronous transmission under different CUs or different gNBs.

In an embodiment, the multi-cell synchronous transmission within the same DU means that the same DU includes multiple cells and that the multiple cells are divided into one SFN area, that is, multiple cells transmit MBS control signaling and MBS user data synchronously. The synchronization refers to synchronous transmission in time and also means that the same content is sent using the same transmission resource. The same transmission resource includes, for example, time domain, frequency domain, BWP, subcarrier spacing, cyclic prefix, and modulation and coding scheme. The same content includes MBS control signaling and MBS user data.

In an embodiment, in the scenario of multi-cell synchronous transmission under different DUs in the same CU, the same CU belongs to the same gNB, that is, the synchronous transmission of multiple DUs under one gNB. A CU is responsible for the synchronous transmission of multiple DUs. The CU configures the same transmission resource for cells under multiple DUs and instructs multiple DUs to send the same content at the same transmission time. The CU communicates with the multiple DUs through F1 interface signaling.

In an embodiment, the multi-cell synchronous transmission under different CUs or different gNBs may be understood as that different CUs belong to different gNBs and that only by ensuring synchronization among multiple gNBs can the multi-cell synchronous transmission under different CUs or different gNBs be achieved.

In S720, the base station determines, according to the multi-cell MBS synchronization transmission scenario, a corresponding MBS control signaling synchronization strategy and a corresponding MBS user data synchronization strategy.

In an embodiment, in the scenario of multi-cell synchronous transmission in the same DU, that is, multi-cell synchronization of intra-DU, the CU to which the DU belongs and the DU configure the same sending resource for the multiple cells and send the same MBS control signaling and MBS user data simultaneously on the same transmission resource of the multiple cells. One DU belongs to one gNB. One gNB is connected to one MB-UPF. The synchronization of the MBS control signaling and the MBS user data is the responsibility of the DU and the CU connected to the DU.

For the scenario of multi-cell synchronous transmission under different CUs in the same DU, that is, the multi-cell synchronization under different DUs in the same CU, the same CU belongs to one gNB, one gNB is connected to one MB-UPF, synchronization between multiple DUs is indicated by the CU through the F1 interface, and the multiple DUs send the same MBS control signaling and MBS user data on the Uu air interface at the same transmission time and on the same transmission resource according to the CU instructions.

In the scenario of multi-cell synchronous transmission under different CUs or different gNBs, that is, since multiple cells belong to different gNBs or different DUs, different synchronization transmission mechanisms are configured between different gNBs or different DUs to achieve synchronous transmission.

In an embodiment, OAM configuration, the first communication node coordinating through the second interface, or the newly added access stratum network element (that is, a logical entity) may be responsible for wireless interface synchronization. OAM means that an instruction is sent to multiple gNBs through network management and that the multiple gNBs synchronously transmit the MBS control signaling over the air interface according to the received instruction. A second interface Xn exists between the gNBs, and multiple gNBs synchronously send the MBS control signaling through the interaction of the second interface signaling. An access stratum network element is added, the access stratum network element may be connected to multiple gNBs, and the gNBs synchronously transmit the MBS control signaling over the air interface according to the instruction of the access stratum network element.

In an embodiment, the transmission resource in which the MBS control signaling is located is indicated by a system broadcast message, and the content of the MBS control signaling may be indicated by OAM, the Xn interface signaling, or the newly added access stratum network element. In an embodiment, the MBS control signaling may adopt periodic transmission, that is, the transmission periods of different gNBs or different DUs are the same; the same start period is counted at the same time, and each count is incremented by one for each period. The start period of the MBS control signaling may be specified by OAM, the Xn interface signaling, or the newly added access stratum network element, and the value of the period counter is also stored by a corresponding network element, for example, an OAM server, a gNB, or a newly added logical network element.

In S730, the base station synchronously transmits MBS control signaling to the UE according to the MBS control signaling synchronization strategy.

In S740, the base station synchronously transmits MBS user data to the UE according to the MBS user data synchronization strategy and the MBS control signaling.

For the synchronous transmission of the MBS user data, MB-UPF sends the MBS synchronization data packet to the gNB to enable multiple gNBs to receive the same MBS user data from the core network. In an embodiment, the MBS synchronization data packet and the MBS user data may be sent to multiple gNBs together; alternatively, the MBS synchronization data packet may be sent to multiple gNBs independently by the core network element. In an embodiment, the gNB determines, according to the MBS synchronization data packet, the transmission time of the MBS user data and synchronously transmits the MBS user data to the UE according to the transmission synchronization and MBS control signaling.

In S750, the UE receives the MBS control signaling and MBS user data.

In an embodiment, first, the UE receives an MBS announcement message sent by an application server to obtain information such as the identity of an MBS service and a transmission carrier frequency.

Second, the UE in the synchronization area receives a cell system broadcast message, and according to the system broadcast message, acquires configuration information of the MBS control signaling, and according to the configuration information, receives the MBS control signaling. In an embodiment, the MBS control signaling includes MBS resource configuration signaling. The MBS resource configuration signaling may include RRC signaling, MAC CE signaling, and PDCCH signaling. Illustratively, the RNTI value and time domain information corresponding to the TMGI of interest are acquired through RRC signaling, and the required control information is detected according to the RNTI value and the time domain information. In an embodiment, the MBS control signaling also includes an MBS update notification, that is, a message for indicating that the MCCH is updated. In an embodiment, the content of the MBS control signaling is divided into a semi-static part and a dynamic part. The semi-static part adopts the instructions of RRC signaling and MAC CE signaling and is carried by a PDSCH. The content of the semi-static part may include an MBS session identity, an MBS transmission area, and an MBS scheduling period. The dynamic part adopts the instruction of DCI on the PDCCH and adopts the RNTI corresponding to the MBS session identity and the CRC of the PDCCH to perform a modulo 2 addition (exclusive OR) operation. The content of the dynamic part includes a beam, an MBS frequency domain resource configuration, power control, modulation and coding scheme, an MBS update notification, and others.

Figure 8:
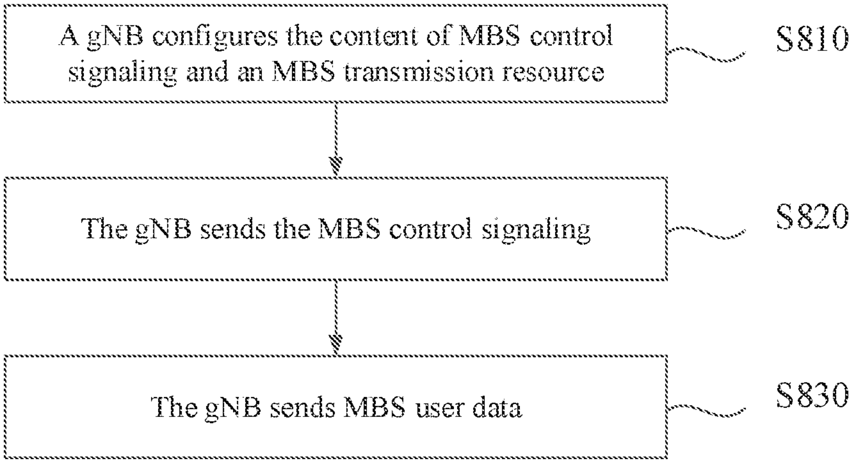
FIG. 8 is a flowchart of an MBS multi-cell synchronization transmission according to an embodiment of the present application.

In an embodiment, FIG. 8 is a flowchart of an MBS multi-cell synchronization transmission according to an embodiment of the present application. In an embodiment, the process of MBS synchronous transmission is described in an example where the multi-cell MBS synchronization transmission scenario is intra-DU or inter-DU and intra-CU, the first network element is DU, the second network element is CU, the first communication node is a base station (gNB), the second communication node is a UE, the first interface is an F1 interface, the second interface is an Xn interface, and the core network element is MB-UPF. As shown in FIG. 8, the synchronous transmission process in this embodiment includes S810 to S830.

In S810, a gNB configures the content of MBS control signaling and an MBS transmission resource.

In an embodiment, the MBS control signaling refers to air interface signaling, including an MBS-related SIB, an MBS update notification, MBS scheduling signaling, and MBS resource configuration signaling; the content of the MBS control signaling includes an MBS transmission resource, an MBS transmission area, configuration information of MBS update notification, an MBS session identity, an MBS synchronization area identity, and MBS scheduling information; the MBS transmission resource refers to the preceding MBS-related SIB, MBS update notification, MBS scheduling signaling, transmission resources of MBS resource configuration signaling, such as time domain, frequency domain, BWP, SCS, CP, MCS, beam, and other resource configurations.

In the case of an intra-DU synchronous transmission scenario, the DU configures lower-layer signaling, such as MAC, RLC, and PHY layer signaling, and the CU to which the DU belongs configures upper-layer signaling, such as RRC, PDCP, and SDAP signaling. In the case of an inter-DU scenario, the CU to which the DU belongs configures the same MBS control signaling and MBS transmission resource in multiple cells, the DU configures the MBS control signaling and MBS transmission resource of each DU itself, such as the system broadcast message in the DU, and the CU is responsible for synchronization between DUs.

In S820, the gNB sends the MBS control signaling.

In an embodiment, the gNB sends the MBS control signaling on a configured MBS transmission resource, and the MBS control signaling is sent in the order where the system broadcast message is first sent, and then the MBS update notification, the configuration information of MBS update notification, and the MBS scheduling information are sequentially sent. The semi-static content part of the preceding message is sent periodically and repeatedly. The PDCCH adopts the same transmission mode at common search space and performs an XOR operation on the the CRC part of the PDCCH using the RNTI corresponding to the MBS session identity (for example, TMGI).

In S830, the gNB sends MBS user data.

In an embodiment, the MBS user data are sent from AF to MB-UPF and are sent by the MB-UPF to the gNB, the gNB receives the MBS user data and stores them in the local buffer, and the gNB sends the MBS user data on an agreed MBS transmission resource according to the instruction of the MBS control signaling (such as MBS scheduling information). The gNB determines whether to buffer or discard the MBS user data received from the MB-UPF according to the information in the received MBS synchronization packet header. The MBS synchronization packet header includes a data packet timestamp, the data packet count value, and the data packet length.

Figure 9:
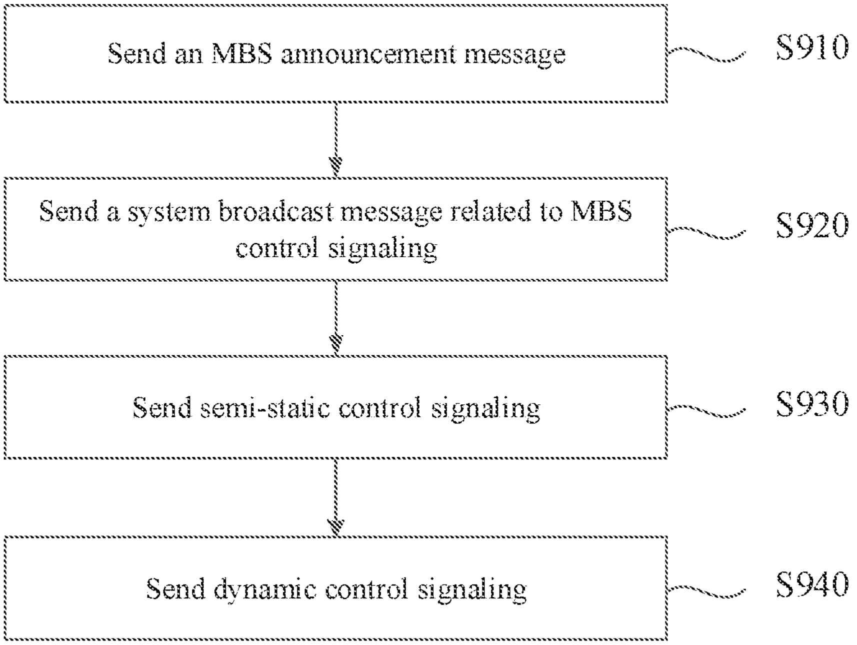
FIG. 9 is a flowchart illustrating MBS multi-cell synchronization transmission of MBS control signaling according to an embodiment of the present application.

In an embodiment, FIG. 9 is a flowchart illustrating MBS multi-cell synchronization transmission of MBS control signaling according to an embodiment of the present application. In an embodiment, the process of MBS multi-cell synchronization transmission of MBS control signaling is described in an example where the multi-cell MBS synchronization transmission scenario is inter-gNB/inter-CU, the first network element is DU, the second network element is CU, the first communication node is a base station (gNB), the second communication node is a UE, the first interface is an F1 interface, the second interface is an Xn interface, and the core network element is MB-UPF. As shown in FIG. 9, the synchronous transmission process in this embodiment includes S910 to S940.

In S910, an MBS announcement message is sent.

In an embodiment, AF sends an MBS announcement message to the UE. The MBS announcement message includes an MBS session identity (for example, TMGI) and an MBS area identity. In an embodiment, the MBS announcement message also includes information such as an MBS carrier frequency and a start time. The AF sends the MBS announcement message, such as SIP signaling, a text message, a 5G message, an HTTP page, and an APP push through application layer signaling. The UE may also preconfigure the MBS service information, such as User Service Description (USD). The content in USD is consistent with the content of the preceding MBS announcement message. If the UE is pre-configured with USD, the MBS announcement message does not need to be acquired.

The UE may acquire an MBS session identity of interest according to the MBS announcement message, that is, TMGI or MBS multicast address. In an embodiment, the carrier frequency of the MBS deployment, the MBS session start time, and others also be acquired.

In S920, a system broadcast message related to MBS control signaling is sent.

In an embodiment, a system broadcast message related to the MBS is sent, such as a system broadcast message including content such as an MBS update notification and configuration information of MBS update notification. The system broadcast message is sent periodically or according to the UE request.

In S930, semi-static control signaling is sent.

In an embodiment, the semi-static control signaling refers to the signaling transmitted through RRC or MAC CE, such as a period, time offset, an MBS session identity, and an MBS area identity. In an embodiment, the semi-static control signaling also includes carrier frequency, BWP, SCS, CP, and other content.

In S940, dynamic control signaling is sent.

In an embodiment, the dynamic control signaling refers to the signaling transmitted through a PDCCH, such as a frequency domain resource, a beam identity, power control, and MCS. In an embodiment, the dynamic control signaling also includes an MBS update notification.

Figure 10:
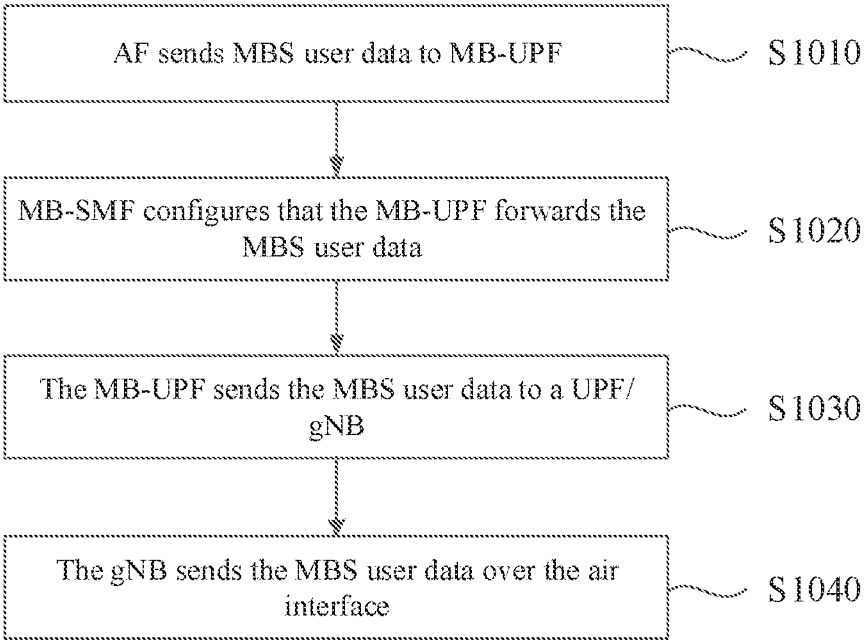
FIG. 10 is a flowchart illustrating MBS multi-cell synchronization transmission of MBS user data according to an embodiment of the present application.

In an embodiment, FIG. 10 is a flowchart illustrating MBS multi-cell synchronization transmission of MBS user data according to an embodiment of the present application. In an embodiment, the process of MBS synchronization transmission of MBS user data is described in an example where the multi-cell MBS synchronization transmission scenario is inter-gNB/inter-CU, the first network element is DU, the second network element is CU, the first communication node is a base station (gNB), the second communication node is a UE, the first interface is an F1 interface, the second interface is an Xn interface, and the core network element is MB-UPF. As shown in FIG. 10, the synchronous transmission process in this embodiment includes S1010 to S1040.

In S1010, AF sends MBS user data to MB-UPF.

In an embodiment, the AF may send the MBS user data to the MB-UPF in a unicast or multicast manner, and the specific manner is determined by the application and interface capabilities. If the transmission network supports multicast transmission, the AF sends the MBS user data to the MB-UPF through a multicast GTP-U tunnel; otherwise, the AF sends the MBS user data to the MB-UPF through a unicast GTP-U tunnel.

In S1020, MB-SMF configures that the MB-UPF forwards the MBS user data.

In an embodiment, the MB-UPF may send the MBS user data to the gNB through unicast or multicast; in the case of unicast transmission, the MB-SMF configures that the MB-UPF copies the MBS user data received from the AF to multiple gNBs through multiple separate GTP-U tunnels; in the case of multicast transmission, the MB-SMF configures that the MB-UPF transmits the MBS user data received from the AF to multiple gNBs through a common GTP-U tunnel.

In S1030, the MB-UPF sends the MBS user data to a UPF/gNB.

In an embodiment, when the MB-UPF adopts unicast to send the MBS user data, a GTP-U tunnel is established for each UPF/gNB, and an IP address of the gNB is used for indicating the gNB, that is, multiple GTP-Us are established for multiple gNBs; when the MB-UPF adopts multicast to send the MBS user data, a common GTP-U tunnel is established for multiple UPFs/gNBs, and a multicast IP address is used for indicating multiple gNBs. To achieve synchronous transmission, the MBS synchronization data packet may be used for transmission between the MB-UPF and gNB.

In S1040, the gNB sends the MBS user data over the air interface.

In an embodiment, multiple gNBs send the MBS user data over the air interface according to instructions of the control signaling, and to ensure synchronization, multiple gNBs send the same MBS user data on the same MBS transmission resource at the same time.

Figure 11:
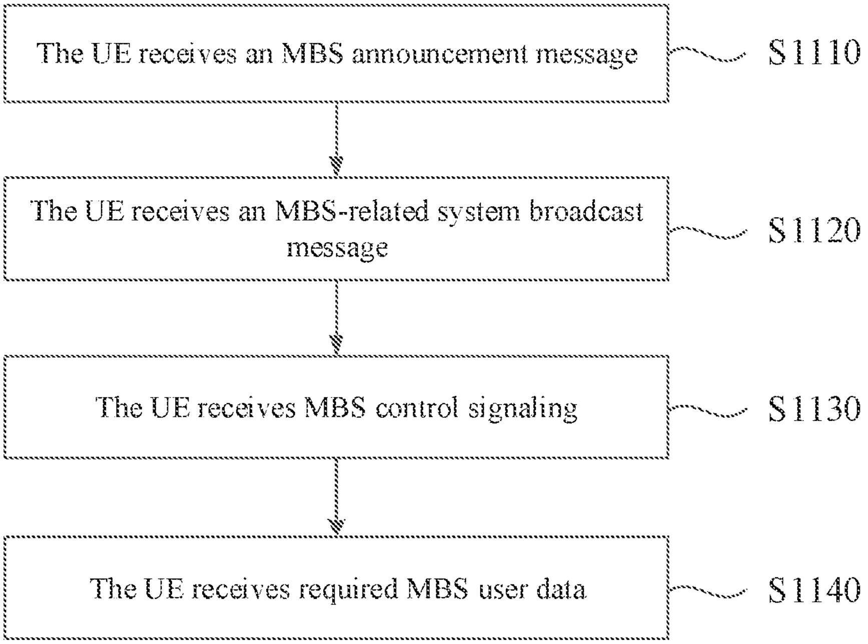
FIG. 11 is a flowchart of receiving multi-cell MBS control signaling and MBS user data according to an embodiment of the present application.

In an embodiment, FIG. 11 is a flowchart of receiving multi-cell MBS control signaling and MBS user data according to an embodiment of the present application. In an embodiment, the process of a UE receiving MBS control signaling and MBS user data synchronously is described by using an example in which a first network element is DU, a second network element is CU, a first communication node is a base station (gNB), a second communication node is a UE, a first interface is an F1 interface, a second interface is an Xn interface, and a core network element is MB-UPF. As shown in FIG. 11, the synchronous reception process in this embodiment includes S1110 to S1140.

In S1110, the UE receives an MBS announcement message.

In an embodiment, the UE receives an MBS announcement message through the application layer signaling that includes one of the following: a text message, a multimedia message, an HTTP page, an APP push, and a 5G message. The MBS announcement message may be pre-configured in the UE, for example, by USD (a file mode; the UE pre-configured with USD does not need to receive the MBS announcement message).

In S1120, the UE receives an MBS-related system broadcast message.

In an embodiment, the UE receives an MBS-related system broadcast message for receiving the MBS control signaling. The system broadcast message is sent periodically or on demand according to UE request.

In S1130, the UE receives MBS control signaling.

In an embodiment, the UE receives the MBS control signaling according to instructions of the system broadcast message. The MBS control signaling is used for receiving the MBS user data. For example, the UE determines whether the MBS session is an MBS service of interest according to the MBS session identity in the MBS control signaling, and if the MBS session is an MBS service of interest, the UE acquires the resource configuration information of the MBS session of interest.

In S1140, the UE receives required MBS user data.

In an embodiment, the UE acquires the resource location of the required MBS user data according to the instruction of the MBS control signaling and receives the required MBS user data on a corresponding MBS transmission resource. The MBS user data are obtained through multiple cells. When the multipath delay of the MBS user data of multiple cells is within the CP length range of a symbol, it can be considered that the received multi-cell signals are all useful signals, and the final required signal is obtained through time domain combining.

Figure 12:
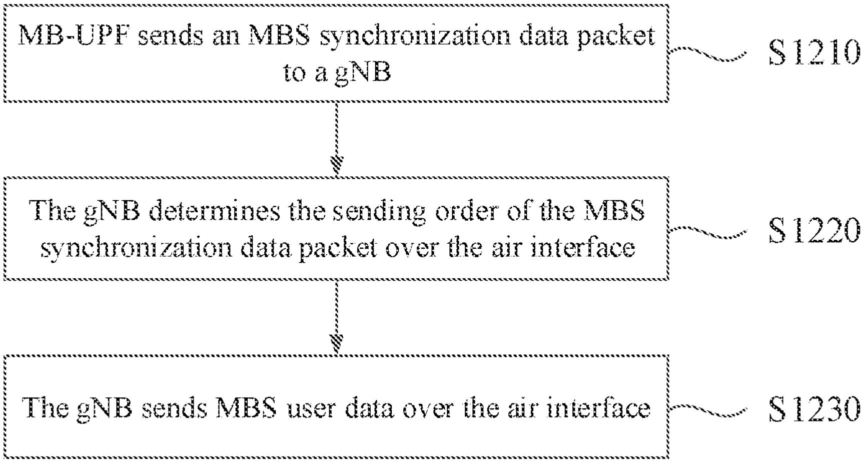
FIG. 12 is a transmission flowchart of an MBS synchronization data packet according to an embodiment of the present application.

In an embodiment, FIG. 12 is a transmission flowchart of an MBS synchronization data packet according to an embodiment of the present application. In an embodiment, the transmission process of an MBS synchronization data packet is described by using an example in which a first network element is DU, a second network element is CU, a first communication node is a base station (gNB), a second communication node is a UE, a first interface is an F1 interface, a second interface is an Xn interface, and a core network element is MB-UPF. As shown in FIG. 12, the transmission process in this embodiment includes S1210 to S1230.

In S1210, MB-UPF sends an MBS synchronization data packet to a gNB.

In an embodiment, at least two MBS synchronization data packet formats are provided, namely, a format that includes MBS user data and a format that does not include MBS user data; the MBS synchronization data packet includes at least a data packet timestamp and the data packet count value. In an embodiment, the MBS synchronization data packet also includes the data packet length, MBS user data, CRC, and data packet payload. The data packet timestamp is a relative time value. For example, relative to a common start reference time, the data packet within the synchronization sequence length range is configured with the same timestamp. For example, the synchronization sequence length is 100 milliseconds, and the timestamp of a data packet arriving within 100 milliseconds is set to the same value. The synchronization sequence length is configured by OAM and is generally proportional to the MBS scheduling cycle. For example, the MBS scheduling period is the length of one or several synchronization sequences, and one synchronization sequence belongs to one MBS session.

In S1220, the gNB determines the sending order of the MBS synchronization data packet over the air interface.

In an embodiment, the gNB determines the sending order over the air interface according to the instruction of the MBS synchronization data packet; if data damage or loss is detected:

(1) If the MBS synchronization data packet contains the MBS user data and the data packet length, the gNB stops sending a corresponding damaged or lost data packet over the air interface;

(2) If the MBS synchronization data packet contains the MBS user data but does not contain the data packet length, the gNB stops sending the data packet over the air interface until the next MBS scheduling period starts;

(3) If the MBS synchronization data packet does not include the MBS user data, the gNB discards an associated data frame or informs the upper layer of the error frame number.

In S1230, the gNB sends MBS user data over the air interface.

In an embodiment, the gNB determines the consistency of the received MBS synchronization data packet and the local data packet count, and if the consistency is satisfied, the gNB sends the MBS user data in the MBS scheduling period according to the value of the data packet timestamp in the MBS synchronization data packet.

Figure 13:
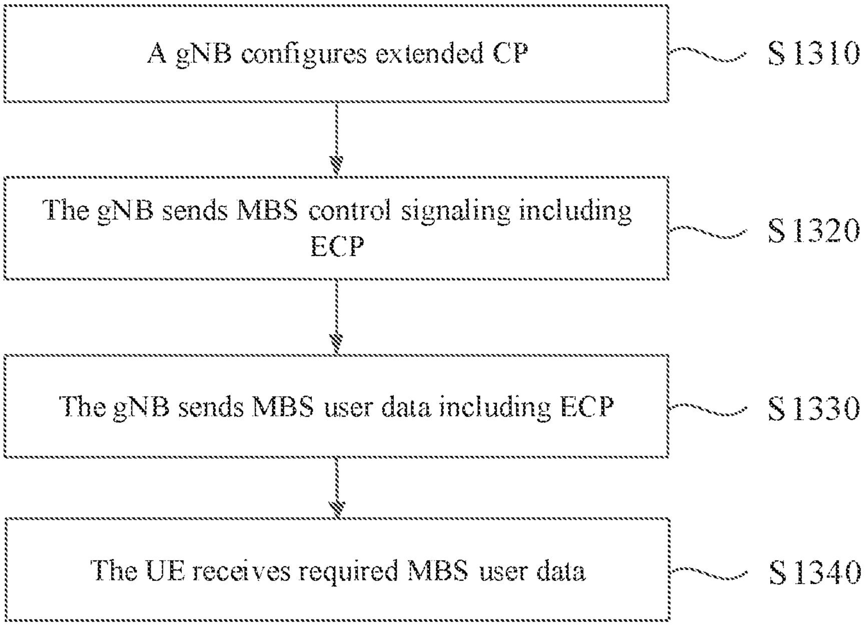
FIG. 13 is a transmission flowchart of MBS control signaling including ECP and MBS user data including ECP according to an embodiment of the present application.

In an embodiment, FIG. 13 is a transmission flowchart of MBS control signaling including ECP and MBS user data including ECP according to an embodiment of the present application. In an embodiment, the transmission process of MBS control signaling including ECP and MBS user data including ECP is described by using an example in which a first network element is DU, a second network element is CU, a first communication node is a base station (gNB), a second communication node is a UE, a first interface is an F1 interface between CU and DU, a second interface is an Xn interface between gNBs, and a core network element is MB-UPF. As shown in FIG. 13, the transmission process in this embodiment includes S1310 to S1340.

In S1310, a gNB configures extended CP.

In an embodiment, the gNB determines the size of the extended CP according to one or more of the following conditions: an MBS transmission geographical area, UE capabilities, MBS service requirements, OAM, or operator requirements; the extended CP refers to the CP exceeding the existing CP length. To ensure backward compatibility, ECP may be employed when SCS=15 KHz.

In S1320, the gNB sends MBS control signaling including ECP.

In an embodiment, the MBS control signaling including the ECP refers to a PDCCH adopting the ECP, that is, a symbol including the PDCCH adopts the ECP.

In S1330, the gNB sends MBS user data including ECP.

In an embodiment, the MBS user data including the ECP refers to the MBS user data transmitted on a PDSCH, that is, a symbol including the PDSCH adopts the ECP.

In S1340, the UE receives required MBS user data.

In an embodiment, the UE receives a PDCCH including the ECP and a PDSCH including the ECP and combines the PDCCH and PDSCH signals received by multiple cells.

Figure 14:
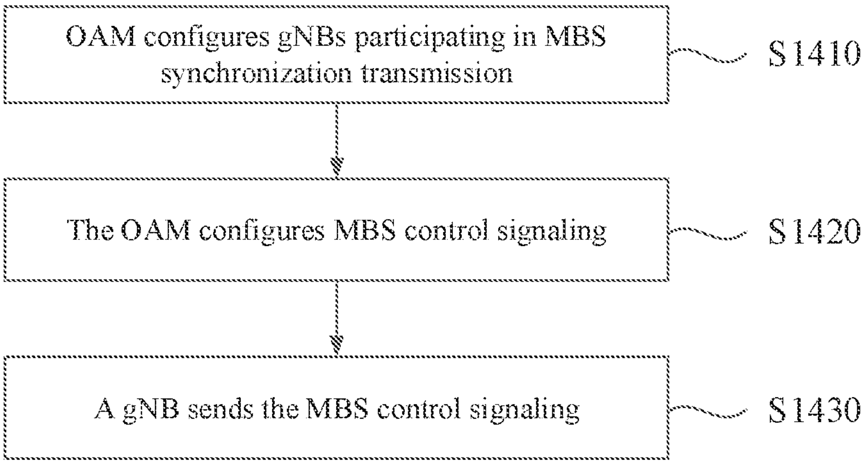
FIG. 14 is a flowchart of multi-cell synchronous transmission under different CUs configured by OAM according to an embodiment of the present application.

In an embodiment, FIG. 14 is a flowchart of multi-cell synchronous transmission under different CUs configured by OAM according to an embodiment of the present application. In an embodiment, the multi-cell synchronous transmission process under different CUs is described by using an example in which a first network element is DU, a second network element is CU, a first communication node is a base station (gNB), a second communication node is a UE, a first interface is an F1 interface, a second interface is an Xn interface, and a core network element is MB-UPF. As shown in FIG. 14, the synchronous transmission process in this embodiment includes S1410 to S1430.

In S1410, OAM configures gNBs participating in MBS synchronization transmission.

In an embodiment, the network management OAM configures the MBS control signaling transmitted by multiple gNBs, that is, an air interface resource and transmission time to ensure that multiple gNBs can achieve synchronous transmission of air interface signaling.

In S1420, the OAM configures MBS control signaling.

In an embodiment, the OAM configures the content of the MBS control signaling, and the content of control signaling includes MBS-related SIB, an MBS update notification, MBS scheduling signaling, an MBS transmission resource; an MBS transmission area, configuration information of MBS update notification, an MBS session identity, an MBS synchronization area identity, and MBS scheduling information.

In S1430, a gNB sends the MBS control signaling.

In an embodiment, the MBS control signaling is transmitted through, for example, a system broadcast message, an MCCH, a PDCCH, a PDSCH, an MBS scheduling message, and configuration information of MBS update notification. The control information may be periodically sent, such as a system broadcast message, an MBS update notification, an MBS scheduling message, and configuration information of MBS update notification. Alternatively, the control information may be dynamically sent, such as a PDCCH.

Figure 15:
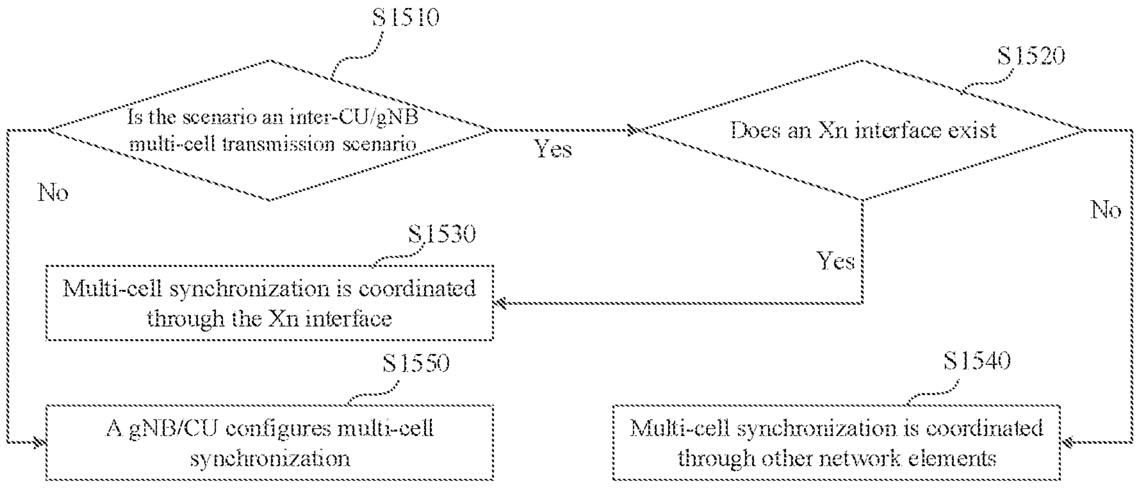
FIG. 15 is a flowchart of multi-cell synchronous transmission under different CUs or gNBs according to an embodiment of the present application.

In an embodiment, FIG. 15 is a flowchart of multi-cell synchronous transmission under different CUs or gNBs according to an embodiment of the present application. In an embodiment, the multi-cell synchronous transmission process under different CUs or gNBs is described by using an example in which a first network element is DU, a second network element is CU, a first communication node is a base station (gNB), a second communication node is a UE, a first interface is an F1 interface, a second interface is an Xn interface, and a core network element is MB-UPF. As shown in FIG. 15, the synchronous transmission process in this embodiment includes S1510 to S1550.

In S1510, it is determined whether the scenario is an inter-CU/gNB multi-cell transmission scenario; if the scenario is an inter-CU/gNB multi-cell transmission scenario, S1520 is performed; if the scenario is not an inter-CU/gNB multi-cell transmission scenario, S1550 is performed.

In an embodiment, S1510 may be implemented by the gNB or may be implemented by one of the following network elements: MB-SMF, MB-UPF, AF, and others.

In S1520, it is determined whether an Xn interface exists; if an Xn interface exists, S1530 is performed; if an Xn interface does not exist, S1540 is performed.

In an embodiment, in the case of the inter-CU/gNB scenario, it is first determined whether an Xn interface exists between gNBs. A gNB may determine whether an Xn interface exists through signaling interaction with relevant gNBs or through instructions from upper-layer core network elements, such as MB-SMF and MB-UPF. It should be noted that the existence of an Xn interface means that the Xn interface exists between any two gNBs participating in multi-cell transmission. For example, assuming that three gNBs of B1, B2, and B3 participate in MBS transmission, the existence of the Xn interface means that an Xn interface exists between any two gNBs among B1, B2, and B3.

In S1530, multi-cell synchronization is coordinated through the Xn interface.

If an Xn interface exists between any two gNBs, the synchronous transmission is coordinated through the Xn interface. For example, synchronous transmission of control signaling is achieved through Xn interface signaling. It should be noted that synchronous transmission may also be achieved through the coordination of upper-layer core network elements to ensure the synchronous transmission.

In S1540, multi-cell synchronization is coordinated through other network elements.

If no Xn interface exists between some gNBs, synchronous transmission is achieved through a common upper-layer core network element. The core network element includes one of the following: Multicast/Broadcast-Session Management Function (MB-SMF), Multicast/Broadcast-User Plane Function, (MB-UPF), Access and Mobility Management Function (AMF), Application Function/Application Server, (AF/AS), and others. For example, if three gNBs of B1, B2, and B3 participate in MBS transmission, no Xn interface exists between B1 and B2/B3, no Xn interface exists between B2 and B3, and B1, B2, and B3 are all connected to MB-SMF1, then MB-SMF1 implements the synchronous transmission of MBS.

In S1550, a gNB/CU configures multi-cell synchronization.

In an embodiment, in the case of the intra-CU/gNB scenario, the gNB/CU is responsible for the synchronous transmission of multiple cells under the gNB/CU, and the gNB configures corresponding control signaling.

Figure 16:
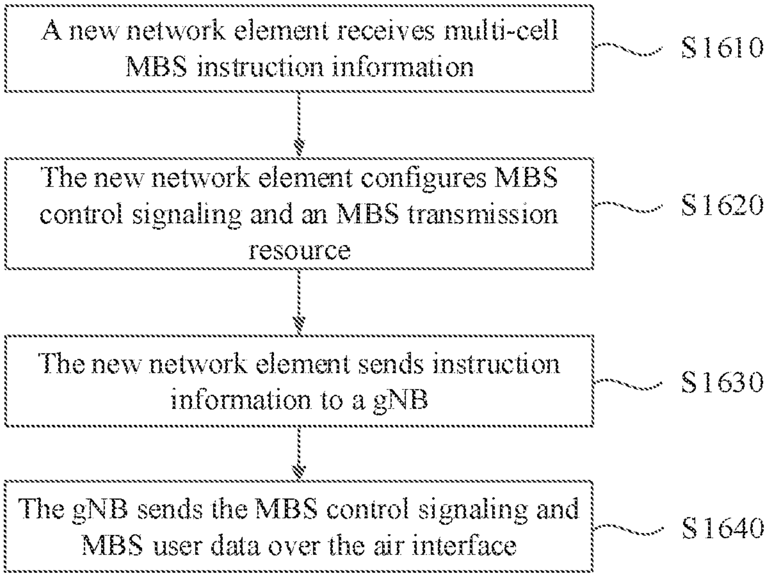
FIG. 16 is a flowchart of multi-cell synchronization transmission configured by a new access network element according to an embodiment of the present application.

In an embodiment, FIG. 16 is a flowchart of multi-cell synchronization transmission configured by a new access network element according to an embodiment of the present application. In an embodiment, the multi-cell synchronization transmission configured by a new access network element is described by using an example in which a first network element is DU, a second network element is CU, a first communication node is a base station (gNB), a second communication node is a UE, a first interface is an F1 interface, a second interface is an Xn interface, and a core network element is MB-UPF. As shown in FIG. 16, the synchronous transmission process in this embodiment includes S1610 to S1640.

In S1610, a new network element receives multi-cell MBS instruction information.

In an embodiment, a new Network Element (NE) refers to a logical network element of the access stratum, which, for example, may be deployed at the same location as the gNB. The new NE is connected to multiple gNBs. The logical connection between the NE and the gNB may be established by OAM or RRC signaling as required. The new NE receives instruction information of multi-cell MBS transmission from the core network.

In S1620, the new network element configures MBS control signaling and an MBS transmission resource.

The new network element configures the MBS control signaling and MBS transmission resource through a logical link with the gNB.

In S1630, the new network element sends instruction information to a gNB.

The new network element sends instruction information to the gNB through a logical interface to indicate, for example, MBS air interface resource configuration, sending time of the air interface, and air interface signaling content to the gNB.

In S1640, the gNB sends the MBS control signaling and MBS user data over the air interface.

The gNB synchronously sends MBS control signaling and MBS user data over the air interface according to the instruction of the new network element.

Figure 17:
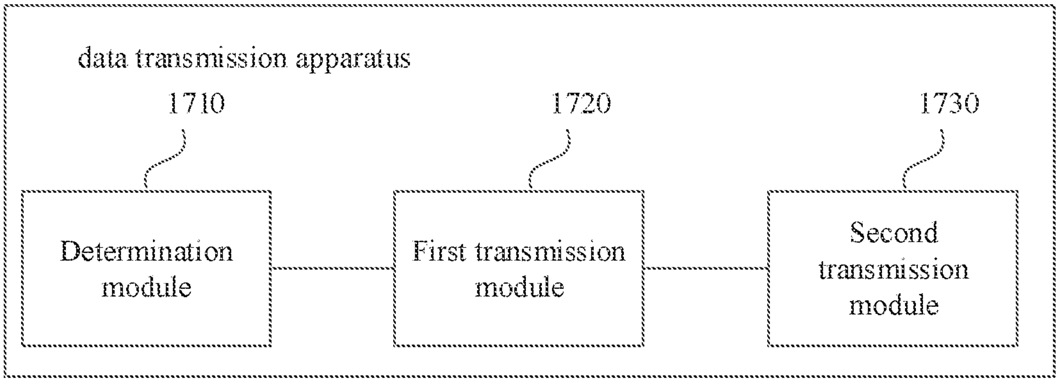
FIG. 17 is a block diagram illustrating the structure of a data transmission apparatus according to an embodiment of the present application.

In an embodiment, FIG. 17 is a block diagram illustrating the structure of a data transmission apparatus according to an embodiment of the present application. This embodiment is applied to a data transmission device. As shown in FIG. 17, the data transmission apparatus in this embodiment includes a determination module 1710, a first transmission module 1720, and a second transmission module 1730.

The determination module 1710 is configured to determine a multi-cell Multicast/Broadcast Service (MBS) synchronization transmission scenario.

The first transmission module 1720 is configured to synchronously transmit MBS control signaling to a second communication node over an air interface according to an MBS control signaling synchronization strategy corresponding to the multi-cell MBS synchronization transmission scenario.

The second transmission module 1730 is configured to synchronously transmit MBS user data to the second communication node over the air interface according to an MBS user data synchronization strategy and the MBS control signaling.

In an embodiment, the multi-cell MBS transmission synchronization scenario includes a multi-cell synchronous transmission within the same first network element.

In an embodiment, the multi-cell MBS transmission synchronization scenario includes a multi-cell synchronous transmission under different first network elements in the same second network element.

In an embodiment, a multi-cell MBS transmission synchronization scenario includes a multi-cell synchronous transmission under different second network elements or different first communication nodes.

In an embodiment, when the multi-cell MBS transmission synchronization scenario is a multi-cell synchronous transmission within the same first network, the first transmission module includes a configuration unit and a first sending unit.

The configuration unit is configured to configure the same transmission resources for multiple cells through the first network element and a second network element to which the first network element belongs.

The first sending unit is configured to simultaneously send the same MBS control signaling to the second communication node on the same transmission resource of the multiple cells.

In an embodiment, when the multi-cell MBS transmission synchronization scenario is a multi-cell synchronous transmission under different first network elements in the same second network, the first transmission module includes a second sending unit and a first transmission unit.

The second sending unit is configured to send, by a second network element, synchronization instruction information to a first network element through a first interface.

The first transmission unit is configured to synchronously transmit, by the first network element, the same MBS control signaling to the second communication node at the same transmission time and the same transmission resources according to the synchronization instruction information.

In an embodiment, when the multi-cell MBS transmission synchronization scenario is a multi-cell synchronous transmission under different second network elements or different first communication, the first transmission module includes configuring the same transmission resources for synchronously transmitting the MBS control signaling through at least one of Operation, Administration and Maintenance (OAM) configuration, second interface coordination, or a newly added access stratum network element.

In an embodiment, the second transmission module includes a determination unit and a second transmission unit.

The determination unit is configured to determine transmission time according to an MBS synchronization data packet sent by a core network element.

The second transmission unit is configured to synchronously transmit the MBS user data to the second communication node according to the transmission time and the MBS control signaling.

In an embodiment, the MBS synchronization data packet includes a data packet timestamp; a data packet count value; a cyclic redundancy check (CRC).

In an embodiment, the MBS synchronization data packet also includes at least one of a data packet length or data packet payload.

In an embodiment, the MBS control signaling includes MBS resource configuration signaling.

In an embodiment, the MBS control signaling also includes at least one of an MBS-related System Information Block (SIB), an MBS update notification, or MBS scheduling signaling.

In an embodiment, the content of MBS control signaling includes at least one of the following: an MBS transmission resource; an MBS transmission area; configuration information of MBS update notification; an MBS session identity; an MBS synchronization area identity; or MBS scheduling information.

In an embodiment, the MBS transmission resource includes a transmission resource of the MBS control signaling and an transmission resource of the MBS user data.

In an embodiment, the MBS transmission resource includes time domain, frequency domain, and a Bandwidth Part (BWP).

In an embodiment, the MBS transmission resource also includes at least one of the following: subcarrier spacing (SCS), Cyclic Prefix (CP), Modulation and Coding Scheme (MCS), or a beam.

In an embodiment, the data transmission apparatus applied to the first communication node also includes a configuration module configured to configure extended Cyclic Prefix (ECP). The ECP is used for carrying symbol transmission of a PDCCH and symbol transmission of a PDSCH.

In an embodiment, the data transmission apparatus applied to the first communication node also includes a third transmission module. The third transmission module is configured to synchronously transmit MBS control signaling including the ECP and MBS user data including the ECP to the second communication node over the air interface according to the data synchronization strategy corresponding to the multi-cell MBS synchronization transmission scenario.

The data transmission apparatus provided in this embodiment is configured to implement the data transmission method applied to the first communication node in the embodiment shown in FIG. 5. The data transmission apparatus provided in this embodiment has similar implementation principles and technical effects, which are not repeated herein.

Figure 18:
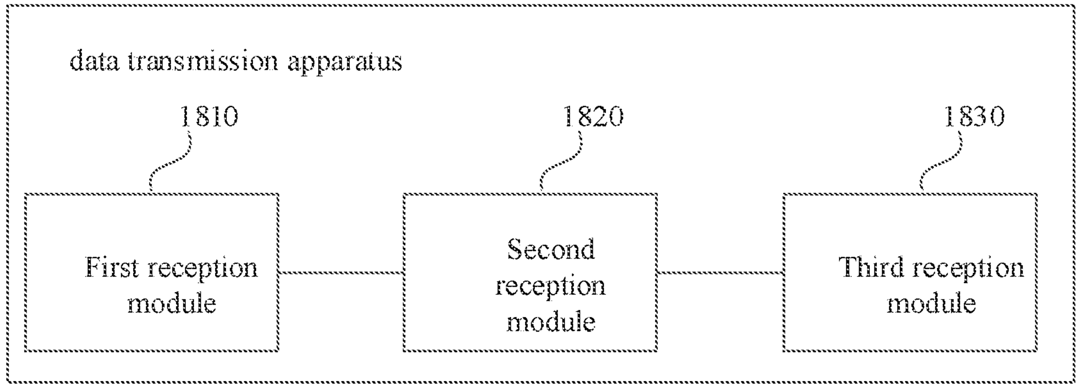
FIG. 18 is a block diagram illustrating the structure of another data transmission apparatus according to an embodiment of the present application.

In an embodiment, FIG. 18 is a block diagram illustrating the structure of another data transmission apparatus according to an embodiment of the present application. This embodiment applies to a data transmission device. The data transmission device may be a second communication node. As shown in FIG. 18, the data transmission apparatus in this embodiment includes a first reception module 1810, a second reception module 1820, and a third reception module 1830.

The first reception module is configured to receive an MBS service announcement message.

The second reception module is configured to receive, according to the MBS service announcement message, MBS control signaling that is in a multi-cell MBS synchronization transmission scenario and sent by a first communication node.

The third reception module is configured to receive MBS user data of interest according to the MBS control signaling.

In an embodiment, the multi-cell MBS transmission synchronization scenario includes a multi-cell synchronous transmission within the same first network element.

In an embodiment, the multi-cell MBS transmission synchronization scenario includes a multi-cell synchronous transmission under different first network elements in the same second network element.

In an embodiment, the multi-cell MBS transmission synchronization scenario includes a multi-cell synchronous transmission under different second network elements or different first communication nodes.

In an embodiment, the data transmission apparatus applied to a second communication node also includes a fourth reception module.

The fourth reception module is configured to receive MBS control signaling including ECP and MBS user data including ECP that are in a multi-cell MBS synchronization transmission scenario and sent by a first communication node.

The data transmission apparatus provided in this embodiment is configured to implement the data transmission method applied to the second communication node in the embodiment shown in FIG. 6. The data transmission apparatus provided in this embodiment has similar implementation principles and technical effects, which are not repeated herein.

Figure 19:
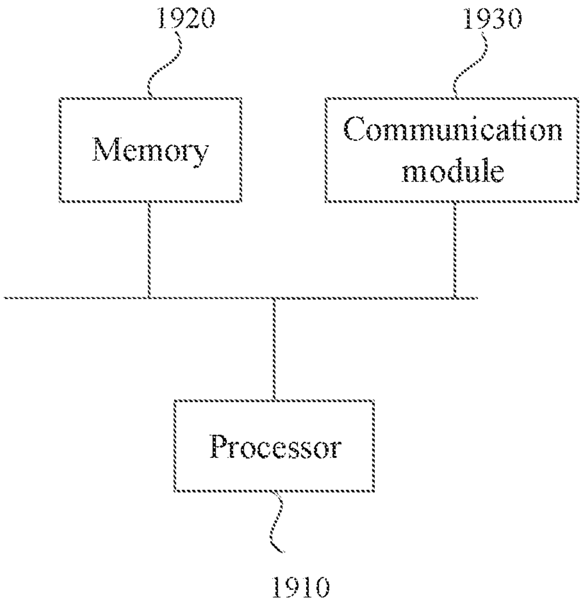
FIG. 19 is a diagram illustrating the structure of a communication device according to an embodiment of the present application.

FIG. 19 is a diagram illustrating the structure of a communication device according to an embodiment of the present application. As shown in FIG. 19, the device provided in the present application includes a processor 1910, a memory 1920, and a communication module 1930. One or more processors 1910 may be included in the device. One processor 1910 is shown as an example in FIG. 19. One or more memories 1920 may be provided in the device. One memory 1920 is shown as an example in FIG. 19. The processor 1910, the memory 1920, and the communication module 1930 in the device may be connected via a bus or in other manners. FIG. 19 shows the connection via a bus as an example. In an embodiment, the device may be a first communication node (such as a base station).

As a computer-readable storage medium, the memory 1920 may be configured to store software programs, computer-executable programs and modules, such as program instructions/modules (for example, the determination module, the first transmission module, and the second transmission module that are applied to the data transmission apparatus of the first communication node) corresponding to the device according to any embodiment of the present application. The memory 1920 may include a program storage region and a data storage region. The program storage region may store an operating system and an application program required by at least one function. The data storage region may store data created according to the use of the device. Additionally, the memory 1920 may include a high-speed random-access memory and may also include a nonvolatile memory such as at least one disk memory, flash memory, or another nonvolatile solid-state memory. In some examples, the memory 1920 may also include memories that are remotely disposed relative to the processor 1910, and these remote memories may be connected to the device via a network. Examples of the preceding network include, but are not limited to, the Internet, an intranet, a local area network, a mobile communication network, and a combination thereof.

The communication module 1930 is configured to perform communication interaction among a first communication node, a second communication node, a first network element, a second network element, a core network element, and an access stratum network element.

In a case where the communication device is a first communication node, the preceding device may be configured to execute the data transmission method applied to the first communication node in any one of the preceding embodiments and has corresponding functions and effects.

In a case where the communication device is a second communication node, the preceding device may be configured to execute the data transmission method applied to the second communication node in any one of the preceding embodiments and has corresponding functions and effects.

An embodiment of the present application also provides a storage medium containing computer-executable instructions. When executed by a computer processor, the computer-executable instructions are used for performing a data transmission method applied to the first communication node. The method includes determining a multi-cell Multicast/Broadcast Service (MBS) synchronization transmission scenario; synchronously transmitting MBS control signaling to a second communication node over an air interface according to an MBS control signaling synchronization strategy corresponding to the multi-cell MBS synchronization transmission scenario; synchronously transmitting MBS user data to the second communication node over the air interface according to an MBS user data synchronization strategy and the MBS control signaling.

An embodiment of the present application also provides a storage medium containing computer-executable instructions. When executed by a computer processor, the computer-executable instructions are used for performing a data transmission method applied to the second communication node. The method includes receiving an MBS service announcement message; receiving, according to the MBS service announcement message, MBS control signaling that is in a multi-cell MBS synchronization transmission scenario and sent by a first communication node; receiving MBS user data of interest according to the MBS control signaling.

It is to be understood by those skilled in the art that the term "user equipment" covers any suitable type of wireless user equipment, for example, a mobile phone, a portable data processing apparatus, a portable web browser, or a vehicle-mounted mobile station.

Generally speaking, various embodiments of the present application may be implemented in hardware or special-purpose circuits, software, logic, or any combination thereof. For example, some aspects may be implemented in hardware while other aspects may be implemented in firmware or software executable by a controller, a microprocessor, or another calculation apparatus, though the present application is not limited thereto.

Embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, state setting data, or source or object codes written in any combination of one or more programming languages.

A block diagram of any logic flow among the drawings of the present application may represent program procedures, may represent interconnected logic circuits, modules, and functions, or may represent a combination of program procedures with logic circuits, modules, and functions. Computer programs may be stored in a memory. The memory may be of any type suitable for a local technical environment and may be implemented using any suitable data storage technology such as, but not limited to, a read-only memory (ROM), a random-access memory (RAM), or an optical memory device and system (a digital video disc (DVD), or a compact disc (CD)). Computer-readable media may include non-transitory storage media. The data processor may be of any type suitable for a local technical environment, such as, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

The above are only embodiments of the present application and are not intended to limit the present application, and for those skilled in the art, the present application may have various modifications and variations. Any modifications, equivalent substitutions, improvements, and the like made within the principle of the present application should fall within the scope of the present application.

What is claimed is:

1. A data transmission method, applied to a first communication node and comprising:

determining a multi-cell Multicast/Broadcast Service (MBS) synchronization transmission scenario;

synchronously transmitting MBS control signaling over multiple cells of the first communication node to a second communication node over an air interface according to an MBS control signaling synchronization strategy corresponding to the multi-cell MBS synchronization transmission scenario; and synchronously transmitting MBS user data over the multiple cells of the first communication node to the second communication node over the air interface according to an MBS user data synchronization strategy and the MBS control signaling;

wherein the multi-cell MBS synchronization transmission scenario comprises:

a multi-cell synchronous transmission within a same first network element;

a multi-cell synchronous transmission under different first network elements in a same second network element; or a multi-cell synchronous transmission under different second network elements;

wherein the first communication node comprises a base station, and the base station comprises a first network element and a second network element, the first network element is a distributed unit, the second network element is a centralized unit, and the second communication node comprises a user equipment; and wherein the MBS control signaling synchronization strategy and the MBS user data synchronization strategy refer to a strategy for synchronous transmission in which the base station controls the multiple cells to synchronously transmit a same content over a same air interface resource, wherein the same content comprises the MBS control signaling and the MBS user data.

2. The method of claim 1, wherein the multi-cell MBS synchronization transmission scenario is the multi-cell synchronous transmission within the same first network element, and synchronously transmitting the MBS control signaling to the second communication node over the air interface according to the MBS control signaling synchronization strategy corresponding to the multi-cell MBS synchronization transmission scenario comprises:

configuring same transmission resources for the multiple cells through the first network element and a second network element to which the first network element belongs; and simultaneously sending same MBS control signaling to the second communication node on the same transmission resources of the multiple cells.

3. The method of claim 1, wherein the multi-cell MBS synchronization transmission scenario is the multi-cell synchronous transmission under the different first network elements in the same second network element, and synchronously transmitting the MBS control signaling to the second communication node over the air interface according to the MBS control signaling synchronization strategy corresponding to the multi-cell MBS synchronization transmission scenario comprises:

sending, by the second network element, synchronization instruction information to the different first network elements through a first interface; and synchronously transmitting, by the different first network elements, same MBS control signaling to the second communication node at same transmission time and same transmission resources according to the synchronization instruction information.

4. The method of claim 1, wherein the multi-cell MBS synchronization transmission scenario is the multi-cell synchronous transmission under the different second network elements, and synchronously transmitting the MBS control signaling to the second communication node over the air interface according to the MBS control signaling synchronization strategy corresponding to the multi-cell MBS synchronization transmission scenario comprises:

configuring same transmission resources for synchronously transmitting the MBS control signaling through at least one of operation, administration and maintenance (OAM) configuration, second interface coordination, or a newly added access stratum network element.

5. The method of claim 1, wherein synchronously transmitting the MBS user data to the second communication node over the air interface according to the MBS user data synchronization strategy and the MBS control signaling comprises:

determining transmission time according to an MBS synchronization data packet sent by a core network element; and synchronously transmitting the MBS user data to the second communication node according to the transmission time and the MBS control signaling.

6. The method of claim 5, wherein the MBS synchronization data packet comprises: a data packet timestamp, a data packet count value, and a cyclic redundancy check (CRC).

7. The method of claim 6, wherein the MBS synchronization data packet further comprises at least one of a data packet length or data packet payload.

8. The method of claim 1, wherein the MBS control signaling comprises MBS resource configuration signaling, and at least one of an MBS-related system information block (SIB), an MBS update notification, or MBS scheduling signaling.

9. The method of claim 1, wherein content of the MBS control signaling comprises at least one of the following: an MBS transmission resource; an MBS transmission area; configuration information of an MBS update notification; an MBS session identity; an MBS synchronization area identity; or MBS scheduling information.

10. The method of claim 9, wherein the MBS transmission resource comprises a transmission resource of the MBS control signaling and a transmission resource of the MBS user data.

11. The method of claim 9, wherein the MBS transmission resource comprises a time domain, a frequency domain, a bandwidth part (BWP), and at least one of the following: a subcarrier spacing (SCS), a cyclic prefix (CP), a modulation and coding scheme (MCS), or a beam.

12. The method of claim 1, further comprising:

configuring an extended cyclic prefix (ECP), wherein the ECP is used for carrying symbol transmission of a physical downlink control channel (PDCCH) and symbol transmission of a physical downlink shared channel (PDSCH).

13. The method of claim 12, further comprising: synchronously transmitting MBS control signaling comprising the ECP and MBS user data comprising the ECP to the second communication node over the air interface according to a data synchronization strategy corresponding to the multi-cell MBS synchronization transmission scenario.

14. A data transmission method, applied to a second communication node and comprising:

receiving a multi-cell Multicast/Broadcast Service (MBS) service announcement message sent by an application server;

receiving, according to the MBS service announcement message, MBS control signaling that is in a multi-cell MBS synchronization transmission scenario and sent by a first communication node; and receiving MBS user data sent by the first communication node according to the MBS control signaling;

wherein the multi-cell MBS synchronization transmission scenario comprises:

a multi-cell synchronous transmission within a same first network element;

a multi-cell synchronous transmission under different first network elements in a same second network element; or a multi-cell synchronous transmission under different second network elements;

wherein the first communication node comprises a base station, and the base station comprises a first network element and a second network element, the first network element is a distributed unit, the second network element is a centralized unit, and the second communication node comprises a user equipment; and wherein receiving the MBS user data sent by the first communication node according to the MBS control signaling comprises: acquiring a resource location of the MBS user data according to an instruction of the MBS control signaling; and receiving the MBS user data on the resource location.

15. The method of claim 14, further comprising:

receiving MBS control signaling comprising an extended cyclic prefix (ECP) and MBS user data comprising the ECP that are in the multi-cell MBS synchronization transmission scenario and sent by the first communication node.

16. A non-transitory storage medium storing a computer program which, when executed by a processor, performs the method of claim 14.

17. A communication device, comprising: a memory and a processor; wherein a computer program is stored in the memory and the computer program, when executed by the processor, causes the processor to perform the method of claim 1.

18. A non-transitory storage medium storing a computer program which, when executed by a processor, performs the method of claim 1.

19. A communication device, comprising: a memory and a processor; wherein a computer program is stored in the memory and the computer program, when executed by the processor, causes the processor to perform the method of claim 14.

* * * * *